United States Patent
Fukuda et al.

(10) Patent No.: US 10,647,602 B2
(45) Date of Patent: May 12, 2020

(54) METHOD AND DEVICE FOR WATER QUALITY IMPROVEMENT

(71) Applicants: Kunio Fukuda, Tochigi (JP); Takahisa Fukuda, Tochigi (JP)

(72) Inventors: Kunio Fukuda, Tochigi (JP); Takahisa Fukuda, Tochigi (JP); Rikiichi Kawata, Tochigi (JP); Youichi Sekine, Tochigi (JP)

(73) Assignees: Kunio FUKUDA, Tochigi (JP); Takahisa FUKUDA, Tochigi (JP)

( * ) Notice: Subject to any disclaimer, the term of this patent is extended or adjusted under 35 U.S.C. 154(b) by 246 days.

(21) Appl. No.: 15/764,512

(22) PCT Filed: Oct. 7, 2015

(86) PCT No.: PCT/JP2015/078555
§ 371 (c)(1),
(2) Date: Mar. 29, 2018

(87) PCT Pub. No.: WO2017/060995
PCT Pub. Date: Apr. 13, 2017

(65) Prior Publication Data
US 2018/0273409 A1  Sep. 27, 2018

(51) Int. Cl.
*C02F 7/00* (2006.01)
*C02F 1/68* (2006.01)
(Continued)

(52) U.S. Cl.
CPC ............... *C02F 7/00* (2013.01); *A01K 75/00* (2013.01); *B01F 3/0473* (2013.01);
(Continued)

(58) Field of Classification Search
CPC ... A01K 63/042; A01K 75/00; B01F 3/04503; B01F 3/0473; B01F 5/0065;
(Continued)

(56) References Cited

U.S. PATENT DOCUMENTS

| 5,514,267 A | 5/1996 | Machiya et al. |
| 5,593,480 A | 1/1997 | Poschl |

(Continued)

FOREIGN PATENT DOCUMENTS

| JP | H06063371 A | 3/1994 |
| JP | h108505316 A | 6/1996 |

(Continued)

OTHER PUBLICATIONS

International Search Report dated Mar. 22, 2016 filed in PCT/JP2015/078555.

(Continued)

*Primary Examiner* — Charles S Bushey
(74) *Attorney, Agent, or Firm* — Rankin, Hill & Clark LLP

(57) ABSTRACT

A configuration for water purification undergoes the water supply step of taking in treatment water through a water suction port and pressure-feeding the treatment water, the air supply step of taking in air through an air suction port and supplying the air, the oxygen amount increasing step of pressurizing the air supplied at the air supply step to increase the total amount of oxygen, the ionization step of ionizing the pressurized air subjected to the oxygen amount increasing step, the mixing step of obtaining gas-liquid mixing fluid subjected to first fine air bubble formation by spraying the air into the flow of treatment water, and the accelerated spraying step of performing second fine air bubble formation by accelerating a flow velocity by a narrowed-diameter portion provided at a spray nozzle when the gas-liquid mixing fluid obtained through the mixing step is sprayed into the treatment water.

7 Claims, 19 Drawing Sheets

(51) Int. Cl.
*B01F 5/06* (2006.01)
*B01F 5/00* (2006.01)
*B01F 5/04* (2006.01)
*B01F 3/04* (2006.01)
*A01K 75/00* (2006.01)
*A01K 63/04* (2006.01)
*B01F 5/02* (2006.01)
*C02F 1/72* (2006.01)
*C02F 103/00* (2006.01)

(52) U.S. Cl.
CPC ........ *B01F 3/04503* (2013.01); *B01F 5/0065* (2013.01); *B01F 5/0465* (2013.01); *B01F 5/0651* (2013.01); *B01F 5/0696* (2013.01); *C02F 1/68* (2013.01); *A01K 63/042* (2013.01); *B01F 5/0206* (2013.01); *B01F 5/0428* (2013.01); *B01F 2003/04858* (2013.01); *B01F 2003/04879* (2013.01); *C02F 1/727* (2013.01); *C02F 2103/007* (2013.01)

(58) Field of Classification Search
CPC .... B01F 5/0465; B01F 5/0651; B01F 5/0696; B01F 5/0206; B01F 5/0428; B01F 2003/04858; B01F 2003/04879; C02F 7/00; C02F 1/68; C02F 1/727; C02F 2103/007
USPC .............................................. 261/76, 77, 115
See application file for complete search history.

(56) References Cited

U.S. PATENT DOCUMENTS

| | | | |
|---|---|---|---|
| 6,290,917 B1 | 9/2001 | Yamamoto | |
| 2001/0045673 A1* | 11/2001 | Ogston | B01F 3/0446 261/76 |
| 2004/0246813 A1* | 12/2004 | Lang | B01F 3/0873 366/162.4 |
| 2004/0251566 A1* | 12/2004 | Kozyuk | B01F 3/0446 261/76 |
| 2007/0040288 A1* | 2/2007 | Emilsen | B01F 3/0446 261/76 |
| 2007/0257381 A1* | 11/2007 | Chuang | B01F 3/0446 261/76 |
| 2011/0248413 A1* | 10/2011 | Glomset | B01F 5/0413 261/76 |
| 2013/0193081 A1* | 8/2013 | Vasiliu | B01F 3/04503 210/760 |

FOREIGN PATENT DOCUMENTS

| | | |
|---|---|---|
| JP | I-111221582 A | 8/1999 |
| JP | 2000051850 A | 2/2000 |
| JP | 2001079557 A | 3/2001 |
| JP | 2001121186 A | 5/2001 |
| JP | 2002065835 A | 3/2002 |
| JP | 2005152874 A | 6/2005 |
| JP | 2005262200 A | 9/2005 |
| JP | 2005288385 A | 10/2005 |
| JP | 2006116390 A | 5/2006 |
| JP | 2006167612 A | 6/2006 |
| JP | 2008023491 A | 2/2008 |
| JP | 2008030009 A | 2/2008 |
| JP | 2009160489 A | 7/2009 |
| JP | 2009268964 A | 11/2009 |
| JP | 1879365 B1 | 2/2012 |
| JP | 2013224918 A | 10/2013 |
| JP | 2015199013 A | 11/2015 |
| KR | 101170089 B1 | 7/2012 |

OTHER PUBLICATIONS

Notification of Reasons for Refusal dated Aug. 29, 2014; English machine translation obtained from Dossier.

Decision to Decline the Amendment dated Apr. 1, 2015; English machine translation obtained from Dossier.

* cited by examiner

FIG. 1
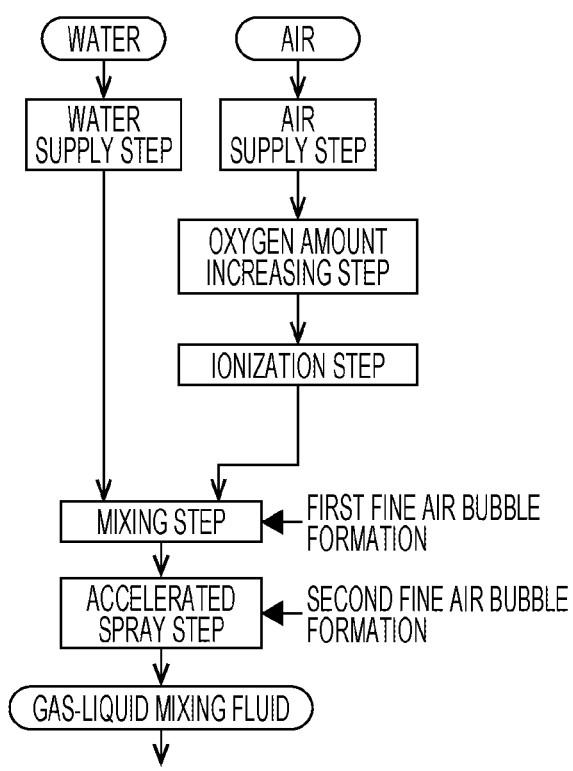
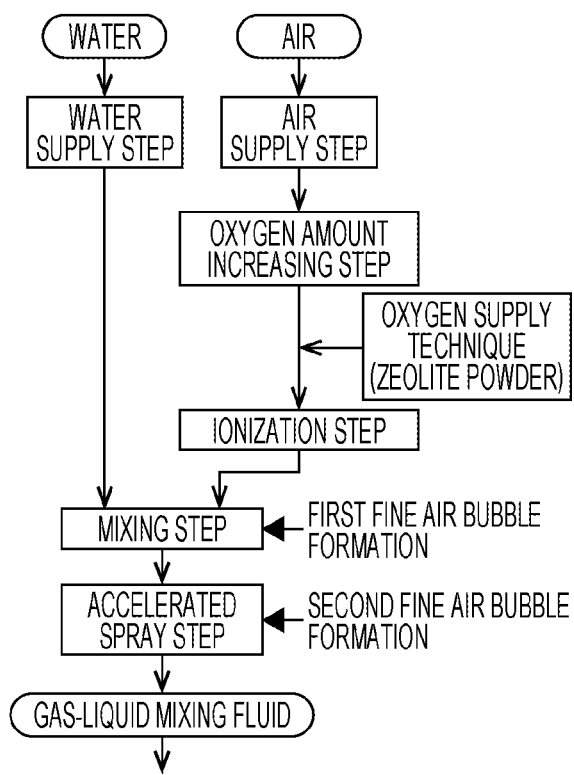
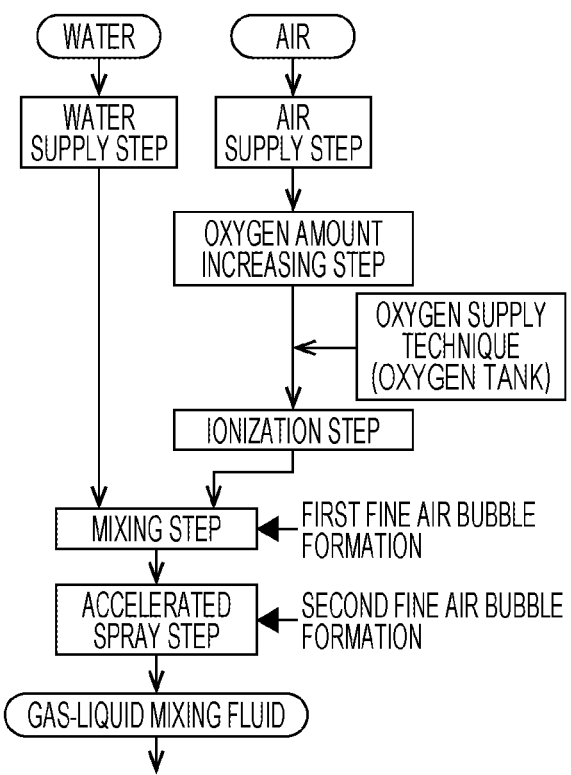

FIG. 7
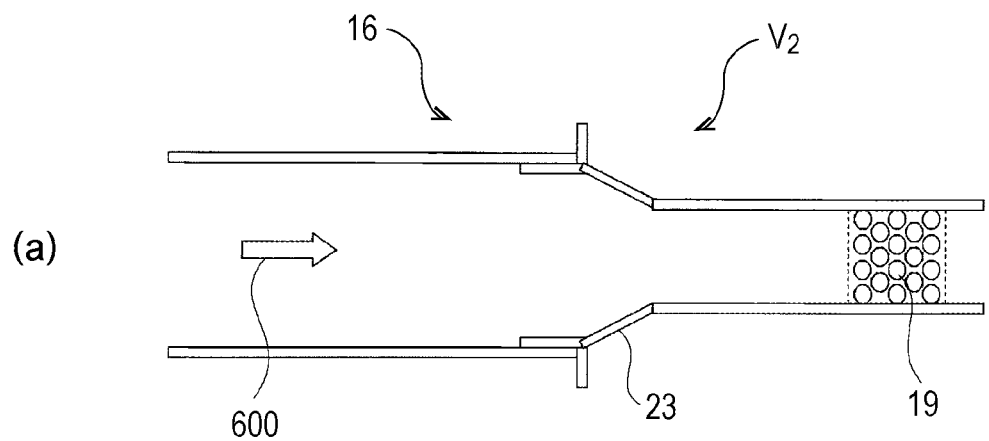
(a)
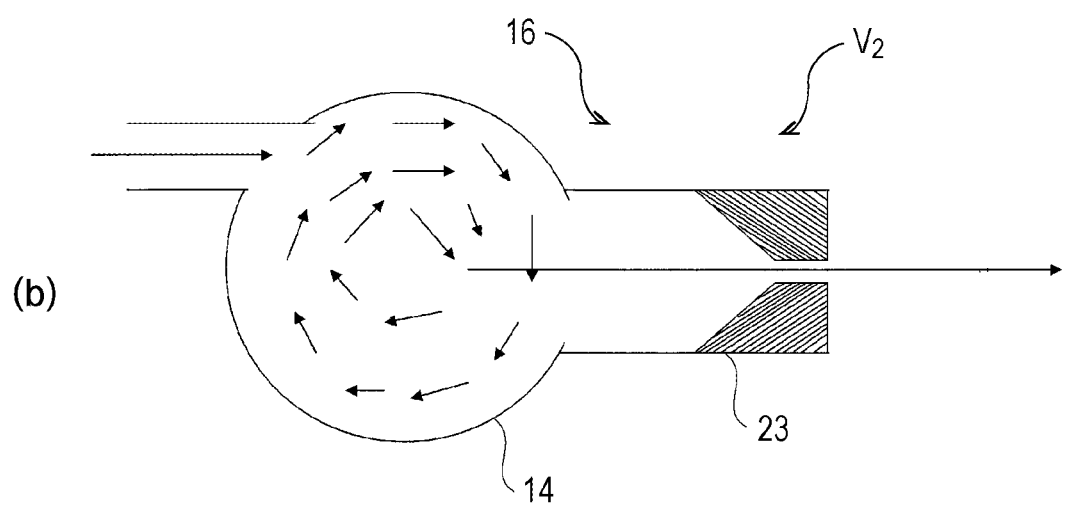
(b)
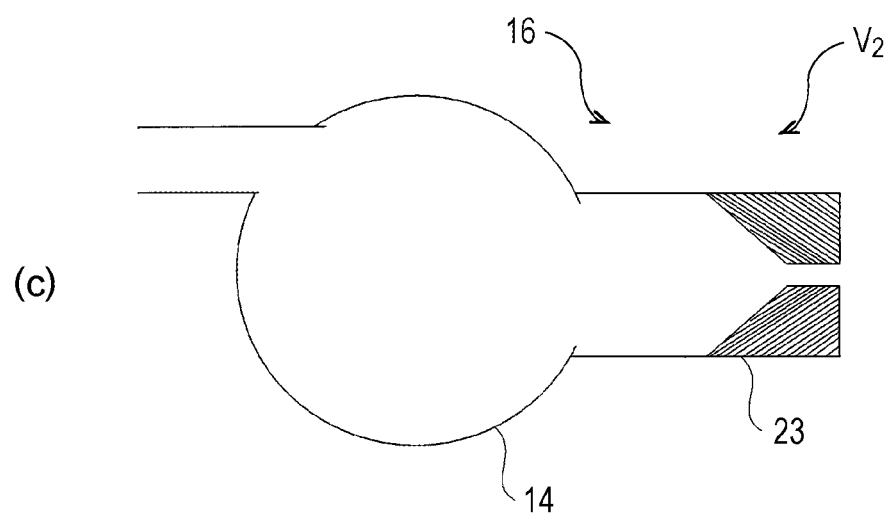
(c)

MEASUREMENT CERTIFICATION  No. 010802-0064  1/1 PAGE
AUGUST 8, 2001

CONCENTRATION MEASUREMENT CERTIFICATION
OFFICE REGISTERED AS NO. 172 BY GOVERNOR OF TOCHIGI
TO CLEAR CO., LTD.     ENVIRONMENT TECHNOLOGY ASSOCIATION TOCHIGI
2145-13 SHIMOOKAMOTO, KAWACHI-CHO, KAWACHI-GUN, TOCHIGI
TEL: 028-673-9080 (MAIN PHONE NUMBER)

WE CERTIFY CONCENTRATION MEASUREMENT RESULTS AS FOLLOWS.     NORIYO MORI, CERTIFIED ENVIRONMENT MEASURER

| SAMPLE NAME | POND WATER | | | |
|---|---|---|---|---|
| SAMPLING POINT | TEST POND INNER WATER FOR WATER QUALITY PURIFICATION TEST FOR UENO SHINOBAZU POND | | | |
| SAMPLING DATE AND TIME | (TIME) ON JULY 29, 2001 | WATER TEMPERATURE: —°C  AIR TEMPERATURE: —°C  WEATHER: | | |
| APPLICATION CRITERIA | | OUTER APPEARANCE: —    ODOR: — | | |
| MEASUREMENT ITEMS | MEASUREMENT RESULTS | UNITS | MEASUREMENT METHODS | STANDARD VALUE |
| pH | 7.0 | | JIS K 0102 12 | |
| WATER TEMPERATURE UPON pH MEASUREMENT | 26 | °C | | |
| BOD | 1.0 | mg/l | JIS K 0102 21 | |
| COD | 9.0 | mg/l | JIS K 0102 17 | |
| SS | 4.0 | mg/l | JIS K 0102 14.1 | |
| TOTAL NITROGEN | 0.91 | mg/l | JIS K 0102 45 | |
| TOTAL PHOSPHORUS | 0.025 | mg/l | JIS K 0102 46.3 | |
| *THE FOLLOWING SPACE IS INTENTIONALLY LEFT BLANK* | | | | |

(b)

MEASUREMENT CERTIFICATION  No. 010802-0065  1/1 PAGE
AUGUST 8, 2001

CONCENTRATION MEASUREMENT CERTIFICATION
OFFICE REGISTERED AS NO. 172 BY GOVERNOR OF TOCHIGI
TO CLEAR CO., LTD.     ENVIRONMENT TECHNOLOGY ASSOCIATION TOCHIGI
2145-13 SHIMOOKAMOTO, KAWACHI-CHO, KAWACHI-GUN, TOCHIGI
TEL: 028-673-9080 (MAIN PHONE NUMBER)

WE CERTIFY CONCENTRATION MEASUREMENT RESULTS AS FOLLOWS.     NORIYO MORI, CERTIFIED ENVIRONMENT MEASURER

| SAMPLE NAME | POND WATER | | | |
|---|---|---|---|---|
| SAMPLING POINT | TEST POND OUTER WATER FOR WATER QUALITY PURIFICATION TEST FOR UENO SHINOBAZU POND | | | |
| SAMPLING DATE AND TIME | (TIME) ON JULY 29, 2001 | WATER TEMPERATURE: —°C  AIR TEMPERATURE: —°C  WEATHER: — | | |
| APPLICATION CRITERIA | | OUTER APPEARANCE: —    ODOR: — | | |
| MEASUREMENT ITEMS | MEASUREMENT RESULTS | UNITS | MEASUREMENT METHODS | STANDARD VALUE |
| pH | 9.2 | | JIS K 0102 12 | |
| WATER TEMPERATURE UPON pH MEASUREMENT | 26 | °C | | |
| BOD | 14 | mg/l | JIS K 0102 21 | |
| COD | 39 | mg/l | JIS K 0102 17 | |
| SS | 72 | mg/l | JIS K 0102 14.1 | |
| TOTAL NITROGEN | 4.9 | mg/l | JIS K 0102 45 | |
| TOTAL PHOSPHORUS | 0.28 | mg/l | JIS K 0102 46.3 | |
| *THE FOLLOWING SPACE IS INTENTIONALLY LEFT BLANK* | | | | |

(a)

RESULTS OF FIELD PURIFICATION TEST
FOR SHINOBAZU POND IN UENO PARK

JULY 29, 2001

|  | TEST FIELD OUTER WATER | TEST FIELD INNER WATER |
|---|---|---|
| PH | 9.2 | 7 |
| BOD | 14 | 1 |
| COD | 39 | 9 |
| SS | 72 | 4 |
| TOTAL NITROGEN | 4.9 | 0.91 |
| TOTAL PHOSPHORUS | 0.28 | 0.025 |

MEASUREMENT CERTIFICATION   No. 010903-0076  1/1 PAGE
SEPTEMBER 10, 2001

TO CLEAR CO., LTD.

CONCENTRATION MEASUREMENT CERTIFICATION
OFFICE REGISTERED AS NO. 172 BY GOVERNOR OF TOCHIGI
ENVIRONMENT TECHNOLOGY ASSOCIATION TOCHIGI
2145-13 SHIMOOKAMOTO, KAWACHI-CHO, KAWACHI-GUN, TOCHIGI
TEL: 028-673-9080 (MAIN PHONE NUMBER)

WE CERTIFY CONCENTRATION MEASUREMENT RESULTS AS FOLLOWS.
NORIYO MORI, CERTIFIED ENVIRONMENT MEASURER

| SAMPLE NAME | POND WATER | | | |
|---|---|---|---|---|
| SAMPLING POINT | TEST POND INNER WATER FOR WATER QUALITY PURIFICATION TEST FOR UENO SHINOBAZU POND | | | |
| SAMPLING DATE AND TIME | (TIME) ON AUGUST 31, 2001 | WATER TEMPERATURE: —°C  AIR TEMPERATURE: —°C  WEATHER: — | | |
| APPLICATION CRITERIA | | OUTER APPEARANCE: —   ODOR: — | | |
| MEASUREMENT ITEMS | MEASUREMENT RESULTS | UNITS | MEASUREMENT METHODS | STANDARD VALUE |
| pH | 7.1 | | JIS K 0102 12 | |
| WATER TEMPERATURE UPON pH MEASUREMENT | 24 | °C | | |
| BOD | 0.7 | mg/l | JIS K 0102 21 | |
| COD | 5.5 | mg/l | JIS K 0102 17 | |
| SS | 29 | mg/l | JIS K 0102 14.1 | |
| TOTAL NITROGEN | 0.54 | mg/l | JIS K 0102 45 | |
| TOTAL PHOSPHORUS | 0.017 | mg/l | JIS K 0102 46.3 | |
| *THE FOLLOWING SPACE IS INTENTIONALLY LEFT BLANK* | | | | |

(b)

MEASUREMENT CERTIFICATION   No. 010903-0077  1/1 PAGE
SEPTEMBER 10, 2001

TO CLEAR CO., LTD.

CONCENTRATION MEASUREMENT CERTIFICATION
OFFICE REGISTERED AS NO. 172 BY GOVERNOR OF TOCHIGI
ENVIRONMENT TECHNOLOGY ASSOCIATION TOCHIGI
2145-13 SHIMOOKAMOTO, KAWACHI-CHO, KAWACHI-GUN, TOCHIGI
TEL: 028-673-9080 (MAIN PHONE NUMBER)

WE CERTIFY CONCENTRATION MEASUREMENT RESULTS AS FOLLOWS.
NORIYO MORI, CERTIFIED ENVIRONMENT MEASURER

| SAMPLE NAME | POND WATER | | | |
|---|---|---|---|---|
| SAMPLING POINT | TEST POND OUTER WATER FOR WATER QUALITY PURIFICATION TEST FOR UENO SHINOBAZU POND | | | |
| SAMPLING DATE AND TIME | (TIME) ON AUGUST 31, 2001 | WATER TEMPERATURE: —°C  AIR TEMPERATURE: —°C  WEATHER: — | | |
| APPLICATION CRITERIA | | OUTER APPEARANCE: —   ODOR: — | | |
| MEASUREMENT ITEMS | MEASUREMENT RESULTS | UNITS | MEASUREMENT METHODS | STANDARD VALUE |
| pH | 9.7 | | JIS K 0102 12 | |
| WATER TEMPERATURE UPON pH MEASUREMENT | 24 | °C | | |
| BOD | 12 | mg/l | JIS K 0102 21 | |
| COD | 27 | mg/l | JIS K 0102 17 | |
| SS | 81 | mg/l | JIS K 0102 14.1 | |
| TOTAL NITROGEN | 2.8 | mg/l | JIS K 0102 45 | |
| TOTAL PHOSPHORUS | 0.28 | mg/l | JIS K 0102 46.3 | |
| *THE FOLLOWING SPACE IS INTENTIONALLY LEFT BLANK* | | | | |

(a)

RESULTS OF FIELD PURIFICATION TEST
FOR SHINOBAZU POND IN UENO PARK

AUGUST 31, 2001

|  | TEST FIELD OUTER WATER W1 | TEST FIELD INNER WATER W2 |
|---|---|---|
| PH | 9.7 | 7.1 |
| BOD | 12 | 0.7 |
| COD | 27 | 5.5 |
| SS | 81 | 29 |
| TOTAL NITROGEN | 2.8 | 0.54 |
| TOTAL PHOSPHORUS | 0.28 | 0.017 |

MEASUREMENT CERTIFICATION  No. 011101-0058  1/1 PAGE
NOVEMBER 7, 2001

CONCENTRATION MEASUREMENT CERTIFICATION
OFFICE REGISTERED AS NO. 172 BY GOVERNOR OF TOCHIGI

TO CLEAR CO., LTD.

ENVIRONMENT TECHNOLOGY ASSOCIATION TOCHIGI
2145-13 SHIMOOKAMOTO, KAWACHI-CHO, KAWACHI-GUN, TOCHIGI
TEL: 028-673-9080 (MAIN PHONE NUMBER)

WE CERTIFY CONCENTRATION
MEASUREMENT RESULTS AS FOLLOWS.     NORIYO MORI, CERTIFIED ENVIRONMENT MEASURER

| SAMPLE NAME | POND WATER | | | |
|---|---|---|---|---|
| SAMPLING POINT | TEST POND OUTER WATER FOR WATER QUALITY PURIFICATION TEST FOR UENO SHINOBAZU POND | | | |
| SAMPLING DATE AND TIME | (TIME) ON OCTOBER 31, 2001 | WATER TEMPERATURE: —°C  AIR TEMPERATURE: —°C  WEATHER: — | | |
| APPLICATION CRITERIA | | OUTER APPEARANCE: —   ODOR: — | | |
| MEASUREMENT ITEMS | MEASUREMENT RESULTS | UNITS | MEASUREMENT METHODS | STANDARD VALUE |
| pH | 8.9 | | JIS K 0102 12 | |
| WATER TEMPERATURE UPON pH MEASUREMENT | 21 | °C | | |
| BOD | 8.5 | mg/l | JIS K 0102 21 | |
| COD | 19 | mg/l | JIS K 0102 17 | |
| SS | 100 | mg/l | JIS K 0102 14.1 | |
| TOTAL NITROGEN | 2.6 | mg/l | JIS K 0102 45 | |
| TOTAL PHOSPHORUS | 0.26 | mg/l | JIS K 0102 46.3 | |
| *THE FOLLOWING SPACE IS INTENTIONALLY LEFT BLANK* | | | | |

(b)

MEASUREMENT CERTIFICATION  No. 011101-0058  1/1 PAGE
NOVEMBER 7, 2001

CONCENTRATION MEASUREMENT CERTIFICATION
OFFICE REGISTERED AS NO. 172 BY GOVERNOR OF TOCHIGI

TO CLEAR CO., LTD.

ENVIRONMENT TECHNOLOGY ASSOCIATION TOCHIGI
2145-13 SHIMOOKAMOTO, KAWACHI-CHO, KAWACHI-GUN, TOCHIGI
TEL: 028-673-9080 (MAIN PHONE NUMBER)

WE CERTIFY CONCENTRATION
MEASUREMENT RESULTS AS FOLLOWS.     NORIYO MORI, CERTIFIED ENVIRONMENT MEASURER

| SAMPLE NAME | POND WATER | | | |
|---|---|---|---|---|
| SAMPLING POINT | TEST POND OUTER WATER FOR WATER QUALITY PURIFICATION TEST FOR UENO SHINOBAZU POND | | | |
| SAMPLING DATE AND TIME | (TIME) ON OCTOBER 31, 2001 | WATER TEMPERATURE: —°C  AIR TEMPERATURE: —°C  WEATHER: — | | |
| APPLICATION CRITERIA | | OUTER APPEARANCE: —   ODOR: — | | |
| MEASUREMENT ITEMS | MEASUREMENT RESULTS | UNITS | MEASUREMENT METHODS | STANDARD VALUE |
| pH | 8.9 | | JIS K 0102 12 | |
| WATER TEMPERATURE UPON pH MEASUREMENT | 21 | °C | | |
| BOD | 8.5 | mg/l | JIS K 0102 21 | |
| COD | 19 | mg/l | JIS K 0102 17 | |
| SS | 100 | mg/l | JIS K 0102 14.1 | |
| TOTAL NITROGEN | 2.6 | mg/l | JIS K 0102 45 | |
| TOTAL PHOSPHORUS | 0.26 | mg/l | JIS K 0102 46.3 | |
| *THE FOLLOWING SPACE IS INTENTIONALLY LEFT BLANK* | | | | |

(a)

RESULTS OF FIELD PURIFICATION TEST
FOR SHINOBAZU POND IN UENO PARK

OCTOBER 31, 2001

|  | TEST FIELD OUTER WATER W1 | TEST FIELD INNER WATER W2 |
|---|---|---|
| PH | 8.9 | 6.7 |
| BOD | 8.5 | 2.2 |
| COD | 19 | 3.7 |
| SS | 100 | 2 |
| TOTAL NITROGEN | 2.6 | 0.38 |
| TOTAL PHOSPHORUS | 0.26 | 0.025 |

(b)

FIG. 17
(a)
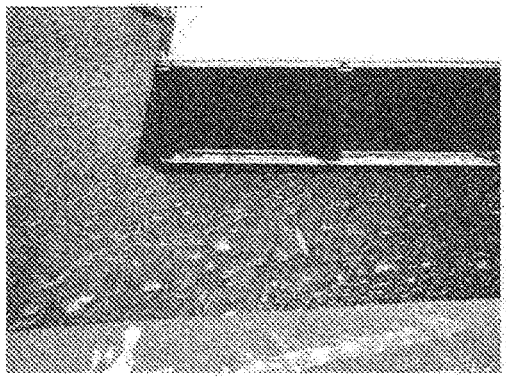
(b)
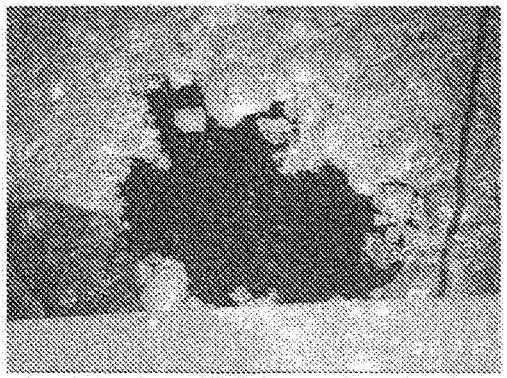
(c)
(d)
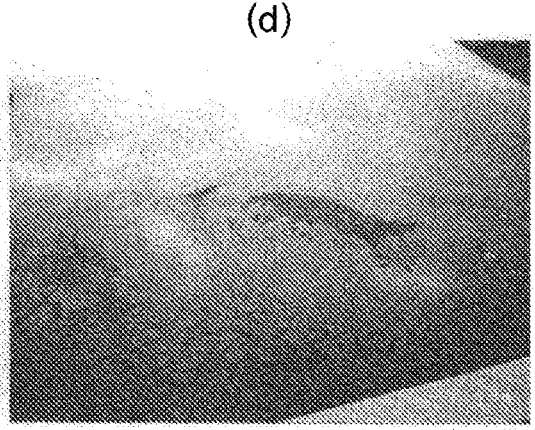

FIG. 19

Grand Lake.OH — KRIA Worksheet

|  | DO Base | DO-1st | 1 week increase |
|---|---|---|---|
| KT1 | 3.98 | 7.41 | 186.18% |
| KT1 | 2.93 | 7.46 | 254.61% |
| KT2 | 4.67 | 9.86 | 211.13% |
| KT2 | 4.36 | 9.31 | 213.53% |
| KT3 | 5.02 | 8.97 | 178.69% |
| KT3 | 4.53 | 9.62 | 212.36% |
| KT4 | 5.32 | 9.62 | 180.83% |
| KT4 | 4.65 | 9.36 | 201.29% |
| KT5 | 7.33 | 10.73 | 146.38% |
| KT5 | 4.82 | 9.61 | 199.38% |
| KT6 | 5.5 | 9.31 | 169.27% |
| KT6 | 4.24 | 9.31 | 219.58% |
| KT7 | 6.76 | 10.16 | 150.30% |
| KT7 | 5.15 | 10.02 | 194.56% |
| KT8 | 7.67 | 11.42 | 148.89% |
| KT8 | 5.26 | 11.08 | 210.65% |
| KT9 | 3.7 | 7.42 | 200.54% |
| KT9 | 3.39 | 7.21 | 212.68% |
| KT10 | 5.32 | 8.22 | 154.51% |
| KT10/ | 4.82 | 8.07 | 167.43% |
| KC1 | 5.6 | 10.56 | 188.57% |
| KC1 | 4.61 | 10.34 | 224.30% |
| KC2 | 9.6 | 12.18 | 126.88% |
| KC2 | 4.36 | 12.01 | 275.46% |
| KC3 |  | 11.8 |  |
| KC3 |  | 10.78 |  |
| KC4 | 8.78 | 12.23 | 139.29% |
| KC4 | 6.45 | 12.07 | 187.13% |
| Test1 | 10.69 | 12.19 | 114.03% |
| Test1 | 6.8 | 11.66 | 171.47% |
| Test2 | 8.77 | 13.28 | 151.43% |
| Test2 | 5.69 | 12.68 | 222.85% |
| Test3 | 9.13 | 12.51 | 137.02% |
| Test3 | 10.21 | 12.28 | 120.27% |

WATER QUALITY PURIFICATION TEST FOR UENO SHINOBAZU POND STARTED ON JULY 18, 2001

STATE OF TRANSPARENCY DEGREE ON JULY 29

METHOD AND DEVICE FOR WATER QUALITY IMPROVEMENT

TECHNICAL FIELD

The present invention relates to a method and a device for improving water quality. Specifically, the present invention relates to a method and a device for improving water quality lowered due to inflow of domestic drainage water and industrial drainage water.

BACKGROUND ART

Typically, various methods and devices have been developed as measures for improving rivers and lakes. These methods and devices include, for example, decomposition of contaminated substances by utilization of microorganisms, physical treatment utilizing, e.g., ozone or ultrasonic waves, and adsorption or filtration by charcoal, bamboo charcoal, or activated charcoal.

Moreover, a national census (a river version) on river environment by the Ministry of Land, Infrastructure, Transport, and Tourism has been reviewed. For example, part of biological assessment and river environment base map preparation assessment having been revised in 2006 has been further revised two years ago, i.e., in March, 2012. As described above, an effort against a water quality environment problem has been just enhanced.

However, it is extremely difficult to improve and purify water in rivers and oceans where contamination has progressed over a long period of time. Without a large-sized water purification treatment device and a long-term process, it is difficult to recover the rivers and the oceans. Specifically, in the case of aiming for water purification in large lakes and oceans, a significant cost is also a problem.

In view of these problems, various techniques have been typically proposed. The inventor(s) of the present application has addressed the problems, and has proposed the techniques. For example, "the method and device for efficiently decomposing and annihilating harmful substances by generating, in contaminated water, many air bubbles taking in negative ions have been proposed (see Patent Literature 1)." According to such an invention, a collision ionization phenomenon occurs, and ultrafine air bubbles are drained to rivers and lakes through an expanded annular opening of a diffuser panel. Further, the drained ultrafine air bubbles can detoxify, upon vanishing, the harmful substances by a cavitation effect. Then, the detoxified treatment residual substances float to a water surface by interfacial aggregation action. These substances can be sucked and processed on the ground. This prevents, at the same time as improvement of the rivers and the lakes, the detoxified residual substances from settling down to bottom portions of the rivers and the lakes and forming bottom sediment sludge. Thus, a river/lake water quality improvement effect is significantly high.

However, contamination has been currently grown into a serious problem even though an attempt has been typically made to improve contaminated water in rivers and lakes by various methods described above. A reason for such a situation is the lack of the method for removing the treatment residual substances detoxified by decomposition, adsorption, filtration, or the like of the harmful contaminated substances. For this reason, there is a problem that the treatment residual substances become the source of generation of a large amount of plankton and the like. The method and the device according to Patent Literature 1 employ a technique which can solve these problems. However, a long period of one to two months is required for such treatment. Thus, the prompt decomposition and removal are not sufficiently performed. Consequently, the problem still remains.

In addition, the following invention and the like have been made. Patent Literature 2 discloses "a microbubble formation device for dissolving microbubbles of gas in liquid." Patent Literature 3 discloses "a water improvement method utilizing bacteria and aquaculture method and system utilizing bacteria." Alternatively, Patent Literature 4 discloses "a contaminated substance treatment device and a contaminated substance treatment method, the device including an electrolysis water manufacturing device configured to manufacture alkaline electrolysis water and acidic electrolysis water and a decontamination device configured to decontaminate a decontamination target object." The decontamination device uses, as a cleaning solution, either of the alkaline electrolysis water and the acidic electrolysis water, both being manufactured by the electrolysis water manufacturing device. Further, Patent Literature 5 discloses "ceramic for a water purification device configured to improve water, the ceramic being incorporated in the water purification device and being configured such that the shape of the ceramic alone is, e.g., a polyhedron surrounded by seven or more planes." Each of these inventions has a unique advantage, and has been considered as effective. However, a water purification effect is unique to each invention. For this reason, it has been demanded to propose a technique of a water purification device configured so that these effects can be exerted in a combined manner with a low cost.

CITATION LIST

Patent Literature

PATENT LITERATURE 1: JP-A-2001-79557
PATENT LITERATURE 2: Japanese Patent No. 4879365
PATENT LITERATURE 3: JP-A-2001-121186
PATENT LITERATURE 4: JP-A-2013-224918
PATENT LITERATURE 5: JP-A-2009-268964

SUMMARY OF THE INVENTION

Problems to be Solved by the Invention

The present invention has been made to solve the above-described problems. The present invention provides the method and device for improving water quality in rivers, lakes, and bays. The water quality improvement method and device according to the present invention detoxify contaminated river/lake water, and do not require posttreatment as the treatment of sucking and removing residual substances subjected to the detoxifying treatment and which have floated to a water surface and of processing these substances on the ground. Further, the water quality improvement method and device according to the present invention can efficiently decompose oil drifting in bays and emulsified by a surfactant. In addition, the device of the present invention has an inexpensive simple structure with less failure and a longer life.

Solutions to the Problems

An object of the present invention is to solve the problems as described above. The present invention employs a technique for purifying water through a water supply step of taking in treatment water through a water suction port and pressure-feeding the treatment water into a device through a water supply pipe, an air supply step of taking in air through an air suction port and supplying the air into the device, an oxygen amount increasing step of pressurizing the air supplied at the air supply step to increase a total amount of oxygen, an ionization step of ionizing the pressurized air subjected to the oxygen amount increasing step, a mixing step of obtaining gas-liquid mixing fluid subjected to first fine air bubble formation by spraying the air into a flow of the treatment water when the pressurized air subjected to the ionization step and the treatment water pressure-fed at the water supply step are mixed, and an accelerated spraying step of performing second fine air bubble formation by accelerating a flow velocity by a narrowed-diameter portion provided at a spray nozzle when the gas-liquid mixing fluid obtained through the mixing step is sprayed into the treatment water.

Moreover, the present invention may also employ such a configuration that at the ionization step, the technique of increasing the total amount of oxygen is used in combination with the oxygen supply technique of increasing an oxygen concentration by adsorbing a nitrogen component by charged zeolite powder.

Further, the present invention may also employ such a configuration that at the ionization step, the technique of increasing the total amount of oxygen is used in combination with the oxygen supply technique of supplying oxygen from an oxygen tank.

Moreover, the present invention is a device for performing the water quality improvement method. The water quality improvement device may also include: a water supply device including a water supply pump and a water supply pipe for taking in treatment water through a water suction port and pressure-feeding the treatment water into the device; an air supply device including an air pump and an air supply pipe for taking in air through an air suction port and supplying the air into the device; an ionization device configured to ionize the pressurized air whose total amount of oxygen has been increased by the air supply device; a mixing device configured to spray the air into a flow of the treatment water at a mixing section configured to mix the pressurized air ionized through the ionization device and the treatment water pressure-fed by the water suction device, thereby obtaining gas-liquid mixing fluid by mixing as well as performing first fine air bubble formation; and an accelerated spraying device configured to perform second fine air bubble formation by accelerating a flow velocity by a narrowed-diameter portion provided at a spray nozzle when the gas-liquid mixing fluid is sprayed through the mixing device.

Moreover, the present invention may also be the water quality improvement device, including an oxygen supply device configured to further increase the total amount of oxygen in the pressurized air pressure-fed from the air supply device. The oxygen supply device increases an oxygen concentration by adsorbing a nitrogen component by charged zeolite powder.

Further, the present invention may also employ such a configuration that the water quality improvement device further includes an oxygen supply device configured to further increase the total amount of oxygen, in the pressurized air pressure, fed from the air supply device and the oxygen supply device supplies oxygen from an oxygen tank.

Advantageous Effects of the Invention

First, an effect by ionization of the air, an effect by an increase in the oxygen amount, and an effect by at least two stages of fine air bubble formation will be described based on experiment results before description of the advantageous effects of the present invention. These effects are individual elements of the invention according to the invention of the present application.

First, FIG. 9 shows the effect by ionization of the air according to the invention of the present application. FIG. 9(a) shows pretreatment industrial drainage water. FIG. 9(b) shows a state after agitation has been performed for one and a half hours with non-ionized air being sprayed. FIG. 9(c) shows a state after ionized air has been used under the same conditions as those of FIG. 9(b). These states are shown for comparison.

The right sample (FIG. 9(c)) subjected to purification treatment by means of air having undergone ionization treatment has a much higher degree of transparency than that of the middle sample (FIG. 9(b)) subjected to the purification treatment by means of air not having undergone the ionization treatment. As will be visually clearly seen, it has been confirmed that an effect of improvement to a clean state is obtained. Thus, measurement was made by a turbidity meter so as to clarify such a difference. As a result, a cross mark on the bottom became invisible at 85 mm in the left sample (FIG. 9(a)) as the untreated industrial drainage water, and also became invisible at 90 mm in the middle sample (FIG. 9(b)) subjected to the purification treatment without only the ionization step. However, in the sample agitated with the ionized air, even when a measurement value exceeds 300 mm as the maximum measurement value of the used turbidity meter, the cross mark on the bottom was visible. That is, use of the ionized air itself exerts a water quality improvement effect.

Further, FIG. 10 shows graphs of measurement results of a change in a dissolved oxygen concentration between the start and end of treatment in the cases of using and not using the water quality improvement method and device according to the present application. Experiment shown by these graphs shows a measurement value of an oxygen concentration obtained by supply of an oxygen of 5 l per minute and a back-flow of a treatment water of 100 l per minute.

The horizontal axis of FIG. 10 represents a time axis (in units of time), and the vertical axis of FIG. 10 represents a dissolved oxygen concentration (in units of mg/l). The dissolved oxygen concentration at the start of the treatment was 6.6 mg/l. The dissolved oxygen concentration after a lapse of six hours from the start of the experiment stops increasing at the point of six hours from the start of the treatment regardless of the presence or absence of ionization. When the treatment is stopped at the point of 18 hours, the dissolved oxygen concentration in purified water not subjected to ionization decreases to the dissolved oxygen concentration in about two hours. On the other hand, the dissolved oxygen concentration in purified water subjected to ionization slightly decreases, but has a high concentration equivalent to the concentration at the point of 18 hours, i.e., a point after completion of the treatment of the present application. Moreover, such a concentration does not greatly decrease even after a lapse of 48 hours. Although not shown in the graphs, the treatment water subjected to ionization according to the present application holds, even after a lapse of two weeks from the end of the treatment, a substantially equivalent dissolved oxygen concentration to that after a lapse of 48 hours. Thus, it has been confirmed that the effect of holding a high dissolved oxygen concentration for a long period of time is obtained.

Further, results of experiment regarding influence on living organisms will be described. In a preserve for cultivation of balloon fish, oxygen needs to be constantly supplied. Moreover, water taken in a storage tank from an ocean needs to be adjusted to about 23±2 degrees Celsius. Further, the above-described oxygen supply is adjusted such that a dissolved oxygen concentration reaches 7 to 9 mg/l while being checked by a DO meter. When the dissolved oxygen concentration reaches equal to or greater than 10 mg/l, the probability of causing a disease reaches a high value of equal to or higher than about 30% together with symptoms such as bronchial respiration failure and popping of the eyes. For this reason, there has been a problem that the oxygen concentration needs to be adjusted with close attention.

According to results of water quality improvement and oxygen supply for the balloon fish cultivation by the device according to the present application, the excellent effect of increasing the dissolved oxygen concentration without use of liquid oxygen typically used for cultivation was obtained as shown in the above-described graphs (FIG. 10).

Moreover, it has been confirmed that even when the dissolved oxygen concentration reaches equal to or greater than 10 mg/l by the device according to the present application, occurrence of an abnormality of the balloon fish can be suppressed to about the half, i.e., about 15%.

Further, the effect of allowing growth in a high dissolved oxygen state under purified environment and facilitating water management by decomposition and purification of organic substances floating in the preserve has been confirmed.

From the above-described effects, the effect of allowing reduction in an antibacterial agent for disease prevention and reducing, by circulation, fuel consumption for maintaining a water temperature has been confirmed according to the purification method and device according to the present application.

In addition, a high dissolved oxygen concentration can be maintained for a long period of time, so that the amount of supplied liquid oxygen and the like to be used in combination can be reduced. Thus, in addition to the above-described effects, an excellent economic effect can be exerted.

In addition, a synergetic effect is, as the advantageous effects of the water quality improvement method and the water quality improvement device according to the present invention, exerted by a combination of oxygen supply by pressurization, oxygen supply for increasing the oxygen concentration, ionization, and the first and second fine air bubble formation. The effect by an increase in the oxygen concentration of the sucked air, the effect by ionization of the gas with a high oxygen concentration, and further the effect by stepwise fine air bubble formation of the ionized high-oxygen-concentration gas in the process from mixing with the water and spraying into the water are exerted synergistically.

By these effects, contaminated river/lake water is detoxified. Further, posttreatment as the treatment of sucking and removing residual substances subjected to the detoxifying treatment and which have floated to a water surface and of processing these substances on the ground is not necessary. Further, oil drifting in bays and emulsified by a surfactant can be efficiently decomposed. In addition, the device has a simple structure with less failure and a longer life, and maintenance of the device is facilitated. Manufacturing and maintenance of the device are at a low cost. Further, component breakdown is less caused, leading to long-term use. In addition, a broad area can be efficiently improved within a relatively-short period of time.

According to the configuration employing the oxygen amount increasing step in the water quality improvement method and the water quality improvement device according to the present invention, the oxygen concentration in the gas is increased by a decrease in nitrogen in the air by an adsorbent. Thus, the gas ionized in the ionization device and having a high oxygen content percentage further activates decomposition action by aerobic microorganisms for decomposing the organic substances. With this configuration, decomposition of the organic substances and the like and improvement of water quality are rapidly performed. Moreover, the excellent effect of increasing the degree of activity of living organisms, such as algae and fish, in the water by the increased oxygen amount and building preferable biological environment is exerted.

Note that in the case of employing a configuration using the ion generation device having a housing pipe of porous conjugate chips obtained by dispersing of ceramic mineral over arum root fibers, the porous conjugate chips obtained by dispersing of the mineral for ionization of the air over the arum root fibers can increase, in the ion generation device according to the invention of the present application, ionization molecules in the gas to equal to or greater than 10 times as great as a normal air ionization amount. In this device, the ionized gas increased to 100 to 10000 times is used. With this configuration, the surfactant of the oil covered with the surfactant, the oil floating to decomposition by the microorganisms, is efficiently detached by ion action and physical action of the treatment water containing the fine air bubbles with improved permeability. Thus, the excellent effect of improving decomposition by the microorganisms is exerted.

BRIEF DESCRIPTION OF THE DRAWINGS

FIG. 1 shows overview flowcharts of a water quality improvement method according to the present invention.

FIG. 7 illustrates sectional views of a configuration of a treatment water spray port of the embodiment of the present invention.

FIG. 11 shows tables of initial experiment results according to the present invention.

FIG. 13 shows tables of results after a lapse of about one month from the start of experiment according to the present invention.

FIG. 15 shows tables of results after a lapse of about three month from the start of the experiment according to the present invention.

FIG. 17 shows photographs for comparison of a water surface state of Shinobazu Pond for which the experiment according to the present invention has been conducted.

FIG. 19 shows dissolved oxygen concentration measurement results in a bay test.

DESCRIPTION OF EMBODIMENTS

The present invention relates to the method for improving water quality across a broad area such as rivers, lakes, and bays and a water quality improvement device used for such a method. The present invention has a greatest characteristic that air whose total oxygen amount has been increased by pressurization is ionized and also gas-liquid mixing fluid obtained by at least two or more stages of fine air bubble formation of the ionized air is sprayed into treatment water. The present invention exerts a high water purification effect.

Figure 2:
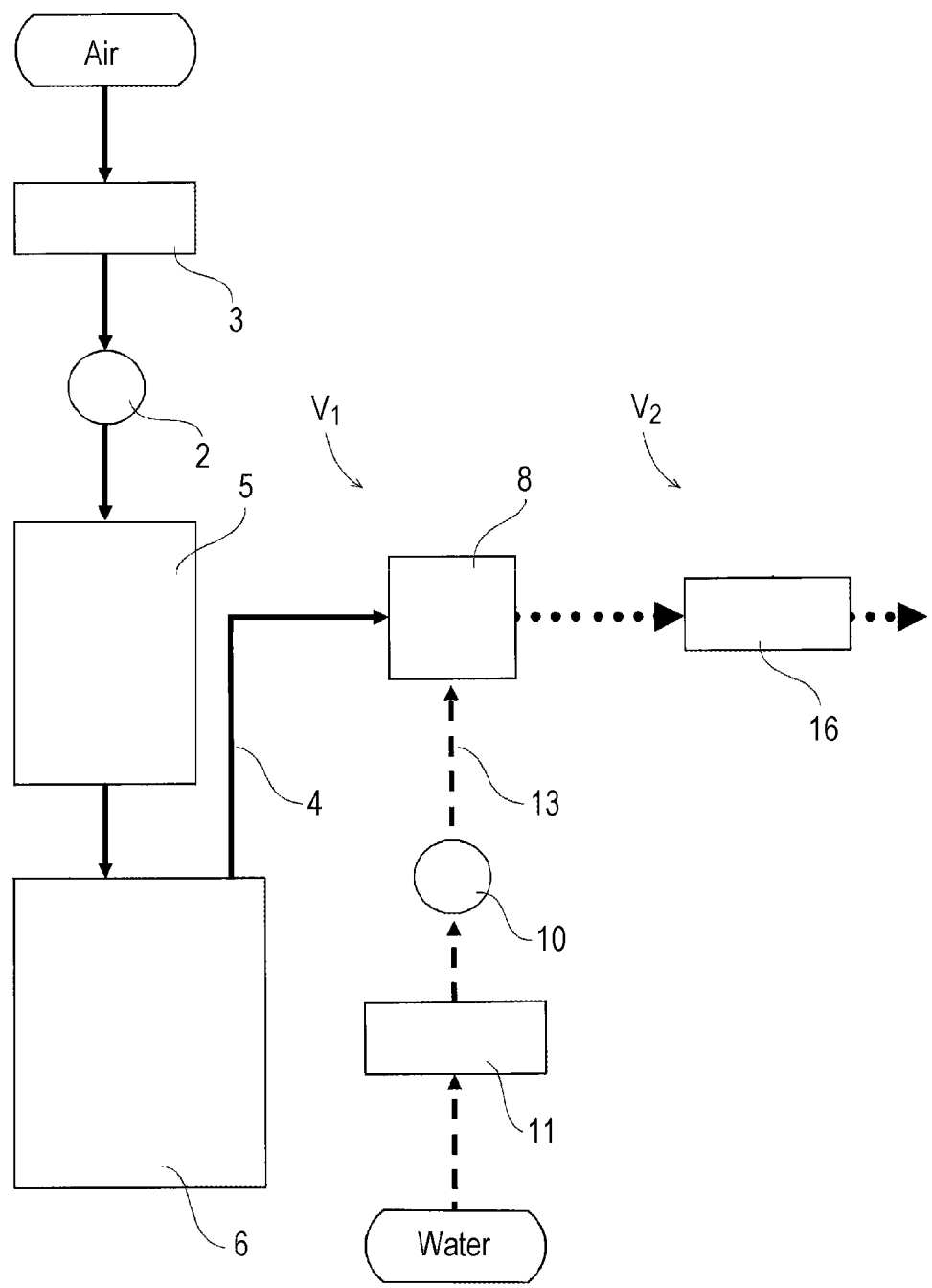
FIG. 2 is a block diagram of the water quality improvement method according to the present invention.
Figure 3:
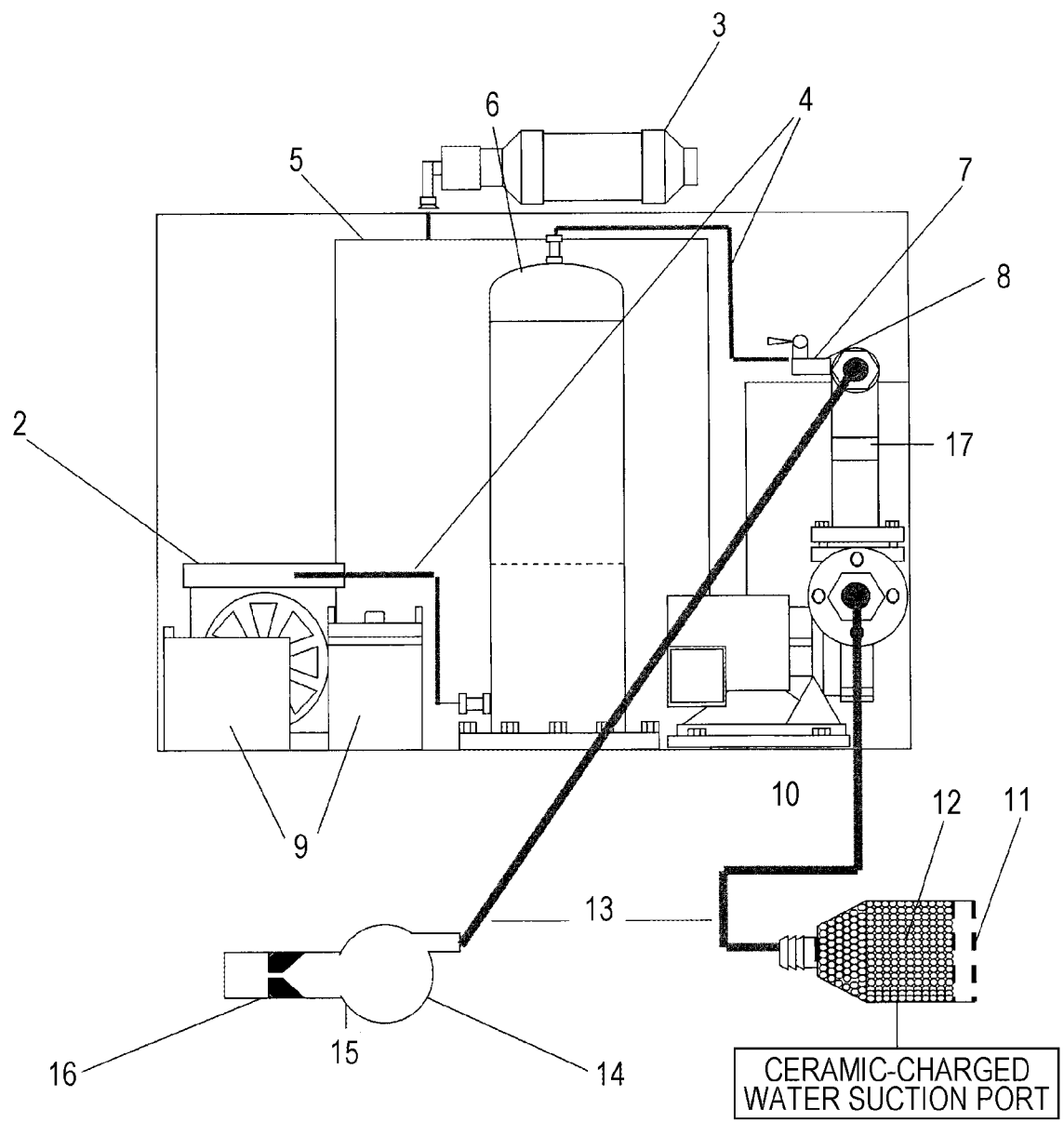
FIG. 3 is a side view of a device with a configuration of an embodiment of the present invention.
Figure 4:
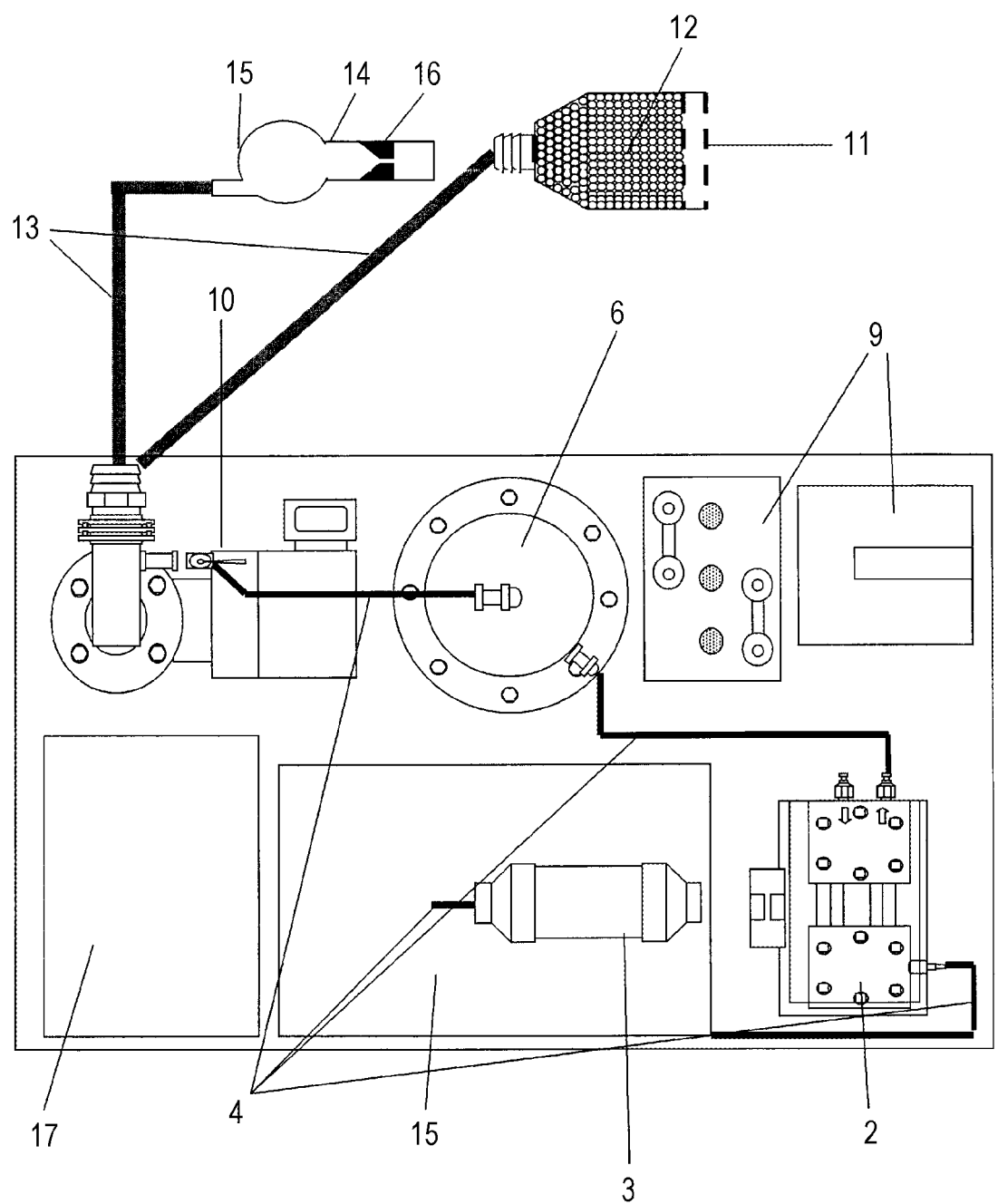
FIG. 4 is a plan view of the device with the configuration of the embodiment of the present invention.
Figure 5:
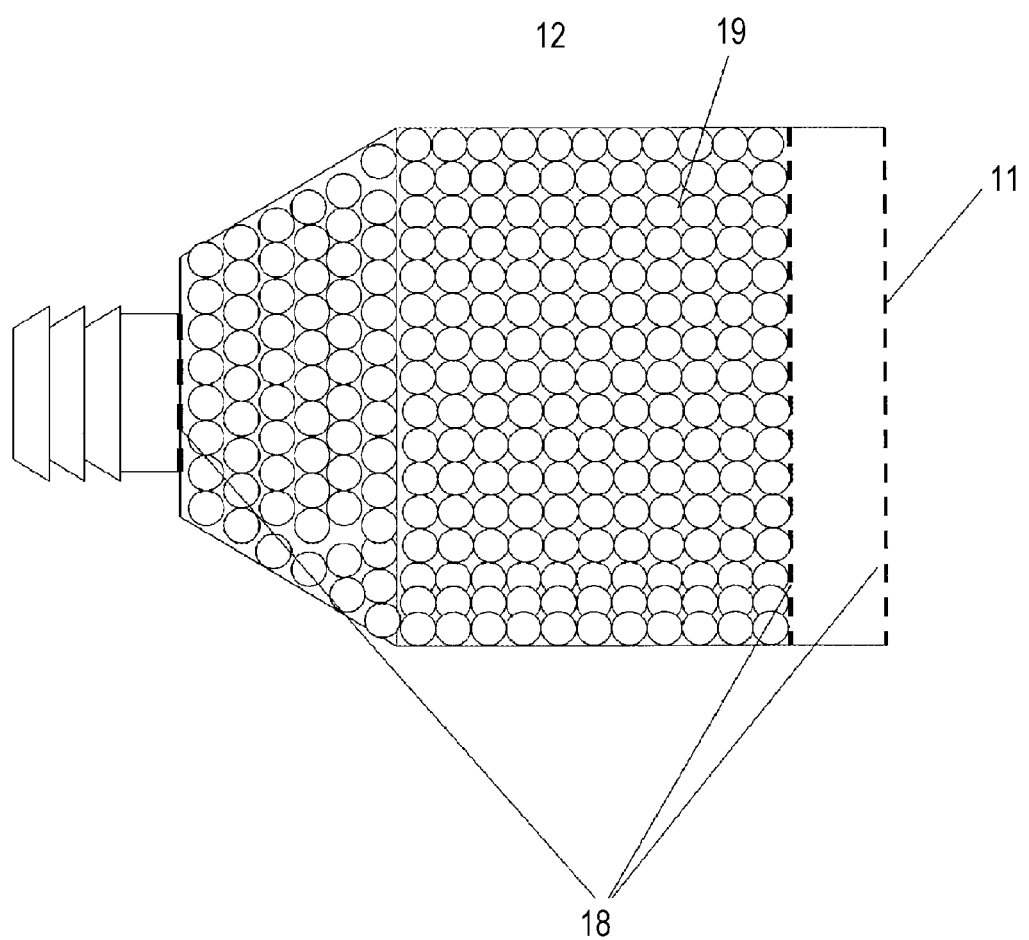
FIG. 5 is a sectional view of a configuration of a water suction port of the embodiment of the present invention.

When fine air bubbles are generated in highly-permeable treatment water, the effect of causing the air bubbles to enter a decomposition target object and more finely dividing the target object due to rupturing of the air bubbles is provided. Thus, in the invention of the present application, the at least two or more stages of fine air bubble formation are performed for forming finer air bubbles. That is, in the present invention, the at least two stages of fine air bubble formation are performed as the technique of generating the fine air bubbles. These two stages of fine air bubble formation include first fine air bubble formation, as illustrated in FIG. 2, at a mixing section configured to mix the pressurized air and the pressure-fed treatment water, and second fine air bubble formation for performing accelerated spraying into the treatment water by a narrowed spray port.

The structure (Venturi) of narrowing the diameter of the spray port is employed while the treatment water is accelerated and sprayed. Thus, the treatment water spreads to distant locations across a broad area. Moreover, the fine air bubbles generate ultrasonic waves upon rupturing, and molecules vibrate due to such impact. Thus, the fine air bubbles also have the effect of annihilating bacteria. In cultivation of oysters, there is a bacteria removal application example where the oysters are cleaned with ultrasonic waves for removing bacteria leading to food poisoning.

A chemical decomposition technique is ionization of gas to be formed into the air bubbles. With this technique, e.g., oil whose microbial decomposition has been typically difficult and which has been emulsified by coverage with a surfactant is, by permeation of the ionized air bubbles, brought into a state in which the surfactant is detached from the oil. Thus, decomposition by microorganisms is efficiently performed. That is, a decomposition efficiency is enhanced by a synergetic effect of a chemical separation technique and a separation technique using the microorganisms. These microorganisms contributing to decomposition are aerobic, and activation of these microorganisms is further enhanced by an increase in an oxygen concentration in the water. Radicals (unpaired electrons) generated in associated with ionization are, as a short-lived intermediate exhibiting a high degree of responsiveness, bound with other non-radical species at a good rate, so that another compound is generated. Thus, in the case of using a filtration filter and the like, adsorption to such a filtration filter and the like is promoted.

As described above, the present invention is the method for improving the water quality in such a manner that water contamination is efficiently and promptly decomposed by a combination of the physical technique, the chemical technique, and the microbial technique. Steps or devices for such techniques will be described below with reference to the drawings.

EXAMPLES

FIG. 1 shows overview flowcharts of a water quality improvement method according to the present invention. FIG. 1(*a*) shows an overview flow of a water quality improvement method according to claim 1. FIG. 1(*b*) shows an overview flow of the water quality improvement method according to claim 2. FIG. 1(*c*) shows an overview flow of the water quality improvement method according to claim 3.

The water quality improvement method according to claim 1 is the water quality improvement method, as shown in FIG. 1(*a*). That is, for air compressed and sent from an air pump 2 at an air suction step, the absolute amount of oxygen per unit volume is increased, and then, the air is sent to an ionization step 100. The air is ionized at the ionization step 100. At a mixing step 200, the ionized air is mixed with supplied water by first fine air bubble formation. Further, at an accelerated spraying step 300, second fine air bubble formation is performed when treatment water whose flow velocity has been increased is discharged.

As shown in FIG. 1(*b*), the water quality improvement method according to claim 2 is the above-described water quality improvement method to which the oxygen amount increasing step 500 of further increasing the oxygen concentration of the compressed air taken in at the air suction step. In FIG. 1(*b*), the oxygen supply technique of adsorbing a nitrogen component by zeolite powder charged as a tool for increasing oxygen to increase the oxygen concentration is used in combination. Moreover, in FIG. 1(*c*), it is effective to use, in combination, the oxygen supply technique of supplying oxygen from an oxygen tank in addition to the technique shown in FIG. 1(*b*).

FIG. 2 is a block diagram of the flow of sucked water, the flow of air sucked by the air pump 2, and the flow of discharging a mixture of the sucked water and the sucked air. Note that for the sake of simplicity of an entire configuration, FIG. 2 illustrates, as an example, a water quality improvement device 1 including all elements necessary for the configuration of the invention described in the claims.

Air having passed through an air filter 3 is discharged from the air pump 2 under at least a high pressure of equal to or higher than an atmosphere pressure. This allows mixing with water in a compressed state. As a result, the amount of dissolved oxygen which can be held in the water increases. Thereafter, the pressure of air dissolved under pressure decreases to the atmosphere pressure at the same time as water discharging. For this reason, excessive dissolved air is formed into air bubbles, leading to white turbidity. A higher pressing force results in a greater amount of such air bubble generation, and degassing occurs as the air bubbles ascend. Thus, the degree of transparency in a container increases, and the air bubbles are vanished after a lapse of several minutes. However, even after the air bubbles have been vanished, the concentration of dissolved oxygen in the water greatly exceeded a saturation concentration. Thus, it can be said that supersaturated air dissolved in the water in a pressurized state has such properties that the entire amount of air is not promptly formed into the air bubbles, but part of the air can be maintained in the water in a supersaturated dissolved state. Thus, the water obtained by the water quality improvement method and the water quality improvement device 1 according to the invention of the present application is functional water contributing to microbial activation (see FIG. 17), for example.

The flow of air in the water quality improvement device 1 will be described. In the flow of air, impurities of external air taken in by the air pump 2 are removed through the air filter 3. Such external air is sent to an oxygen supply device 5 through an air line 4. Further, after the oxygen concentration has been adjusted to 25% to 95% by the oxygen supply device 5, the resultant external air is sent to an ion generation device 6.

The air pump 2 is a device configured to send air necessary for the water quality improvement method and the water quality improvement device 1 according to the invention of the present application. The air pump 2 utilizes the pressing force by the compressed air, thereby dissolving the air in the water until the supersaturated state is brought. In this manner, the air pump 2 generates high-oxygen-concentration water containing supersaturated oxygen. For obtaining the high-oxygen-concentration water, the device needs to have an output property of at least equal to or higher than the atmosphere pressure (0.1 MPa). In theory, the degree of oxygen saturation increases in proportion to the pressing force. For this reason, a device having highly-compressible discharging performance is preferably utilized. Note that for substantially tripling the oxygen concentration, at least a pressure of equal to or higher than 0.2 MPa is necessary. For obtaining an oxygen saturation degree of 95% in units of an oxygen concentration, the output for applying at least a pressure of equal to or higher than 0.5 MPa is necessary. Thus, a desired oxygen concentration can be obtained only by the air pump 2. Instead, it is also effective to use the later-described oxygen supply device 5 in combination to obtain a high concentration of oxygen in a large amount of treatment water, considering reduction in size and power consumption.

The air filter 3 fulfills the role of mainly adsorbing fine dirt and dust in air, as well as fulfilling the role of adsorbing salt in air at the shore to prevent entrance of the salt. Cloth and Japanese paper are used as filter materials used for an experiment.

Some configurations of the oxygen supply device 5 are conceivable. First, an oxygen supply device according to claim 2 will be described. This oxygen supply device is a device configured to separate nitrogen and oxygen from the air pressurized by the air pump 2, thereby extracting the oxygen. The method for separating the air is roughly classified into two types of a "cryogenic separation method" and a "PSA method." The "cryogenic separation method" utilizes a difference between the boiling point of nitrogen and the boiling point of oxygen. The "PSA method" utilizes a difference between the equilibrium adsorption amount of nitrogen and the equilibrium adsorption amount of oxygen. In the present application, the oxygen supply device with zeolite powder filled therein is used. Moreover, the present application employs "oxygen PSA" in which by aeration, the nitrogen component in the air is absorbed by the zeolite powder so as to increase the oxygen concentration. Note that other methods such as "nitrogen PSA" and the above-described "cryogenic separation method" are not excluded.

Moreover, an oxygen supply device 5 as another supply unit according to claim 3 may employ the method for supplying oxygen to the air taken in from the oxygen tank and the like at the suction step, thereby increasing the amount of oxygen. That is, the method for providing advantageous effects according to the invention of the present application is not limited to such a method as long as the function of sending oxygen whose concentration has been increased to 25% to 95% to the ion generation device 6 is fulfilled.

Note that the oxygen supply device 5 is a device different from the configuration of increasing the amount of dissolved oxygen by increasing, as the above-described function of increasing the oxygen concentration, the absolute amount of air by pressurization of the air pump 2. The oxygen supply device 5 is a device used for the water quality improvement method according to claim 2 or 3 and the water quality improvement device 1 used for any of claims 5 to 7.

Figure 6:
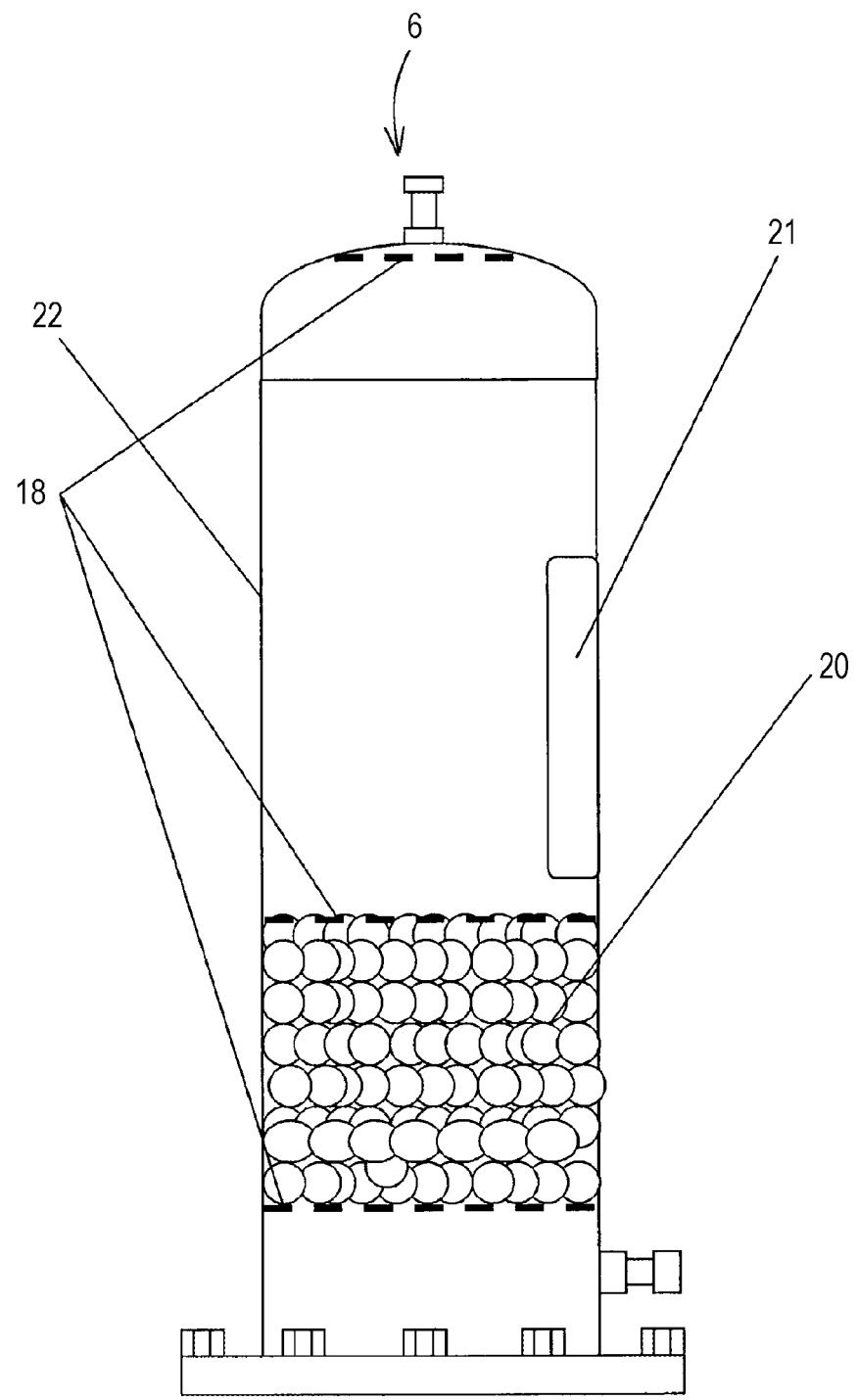
FIG. 6 is a sectional view of a configuration of an ion generation device of the embodiment of the present invention.

The ion generation device 6 of FIG. 6 will be described in detail. A material made of electric insulating plastic is used for a container 22 of the ion generation device 6. The container is filled with ionization ceramic chips 20 surrounded by growing light emission nets 18. The gas sent from the air pump 2 passes through the ionization ceramic chips 20 so as to be ionized. It is also effective to use an ion generator 21 for more reliable ionization. A normal ion concentration in external air is 100 to 200 ions/cc. After having passed through the ion generation device, the external air has an ion concentration increased to 10,000 to 1,000,000 ions/cc.

The ionization ceramic chips 20 are obtained in such a manner that far-infrared radioactive material powder, tourmaline, and fine carbon powder that are bound by arum root fibers are dried and shaped into chips with two to three centimeter square. The ionization ceramic chips 20 each have porous surfaces.

The ion generator 21 is configured to ionize surrounding air by glow discharge caused by an applied alternating electric field.

Next, FIG. 7 illustrates views for describing a configuration of a spray nozzle 16. FIG. 7 illustrates a section where second fine air bubble formation V2 for forming air bubbles of gas-liquid mixing fluid 600 into finer air bubbles is performed. The gas-liquid mixing fluid 600 is gas-liquid mixing fluid containing fine air bubbles formed by first fine air bubble formation V1. FIG. 7(*a*) illustrates such a structure that the gas-liquid mixing fluid accelerated through a narrowed-diameter portion 23 with a narrowed flow path is sprayed from an opening. In this state, fine air bubble formation is further performed, for the gas-liquid nixing fluid by the effect of agitation due to acceleration. FIG. 7(*a*) illustrates a basic configuration, and on the drawing, illustrates a state in which the vicinity of the tip end opening is filled with porous substances. However, the presence of these porous substances is not an essential requirement, and preferably, can be selected depending on the situation.

Moreover, FIGS. 7(*b*) and 7(*c*) illustrate such a configuration that an eddy turbulence generation device 14 is connected to a preceding stage of the spray nozzle to further perform fine air bubble formation in a stepwise manner. The eddy turbulence generation device 14 can be added as necessary.

The eddy turbulence generation device 14 has such a spherical structure that the center position of a water inlet and the center position of a water outlet are not at the same position, but shift from each other. In such a spherical body, eddy turbulence is generated, so that the water discharged from the water outlet contains finer air bubbles.

According to the above-described embodiments, the water quality improvement method of the present invention is the method for improving the quality of water across a broad area such as rivers, lakes, and bays by physically, chemically, and microbially decomposing organic substances floating in the water.

Moreover, in a physical decomposition technique, the fine air bubbles generated in the high-permeable treatment water and which has entered a decomposition target object are ruptured to finely divide the target object. The technique of further generating the fine air bubbles is characterized in that the treatment water is accelerated and sprayed by the narrowed-diameter portion 23 arranged in the spray nozzle 16 and having a narrowed diameter so as to spread to distant locations across a broad area.

Meanwhile, the gas in the air bubbles is ionized by the chemical technique. Thus, by permeation of the ionized air bubbles, a surfactant contained in, e.g., oil emulsified by coverage with the surfactant is brought into the state of detachment from the oil, the oil emulsified by coverage with the surfactant being typically difficult to microbially decompose. Thus, decomposition by microorganisms is performed efficiently. The microorganisms contributing to such decomposition are aerobic, so that activation of such microorganisms is further enhanced as the oxygen concentration in the water increases. The present invention is, as described above, the method for improving the water quality in such a manner that water contamination is efficiently and promptly decomposed by a combination of the physical technique, the chemical technique, and the microbial technique.

Moreover, according to the above-described embodiments, the water quality improvement device 1 sends the external air to the oxygen supply device 5 through the air line 4, the external air being sucked through the air filter 3. Then, the water quality improvement device 1 increases, in the oxygen supply device 5, the oxygen concentration of the external air to 25% to 95%, and then, sends the resultant air to the ion generation device 6. The gas ionized by the ion generation device 6 is, through the air line 4, sucked into the flow of contaminated water at a coupling portion 8 provided with a check valve 7, and then, is mixed into a water line 13. Note that the ionized gas contains 10,000 ions/cc to 1,000,000 ions/cc, and has a high oxygen concentration. Meanwhile, the water sucked by a water suction pump 10 is pressurized, and then, is sent to the coupling portion 8 through a water absorption filter 11. At this point, the ionized pressurized air is taken in the water. Specifically, for the gas and the liquid, the pressurized air is sprayed to the substantially center of a pressurized water path by the coupling portion 8, so that the fine air bubbles are generated while the gas-liquid mixing fluid is formed.

Figure 8:
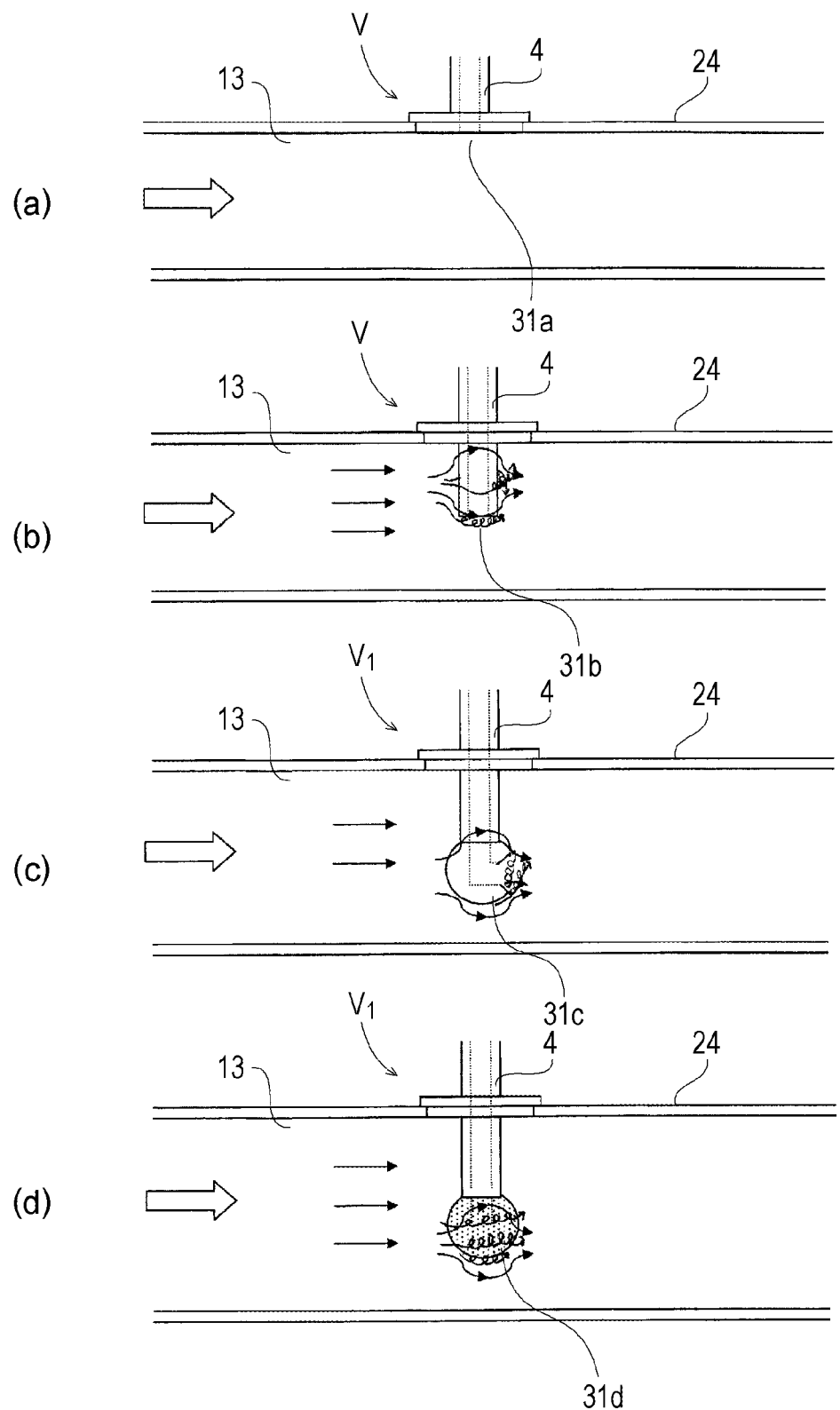
FIG. 8 illustrates views for describing structure examples in first fine air bubble formation according to the present invention.
Figure 9:
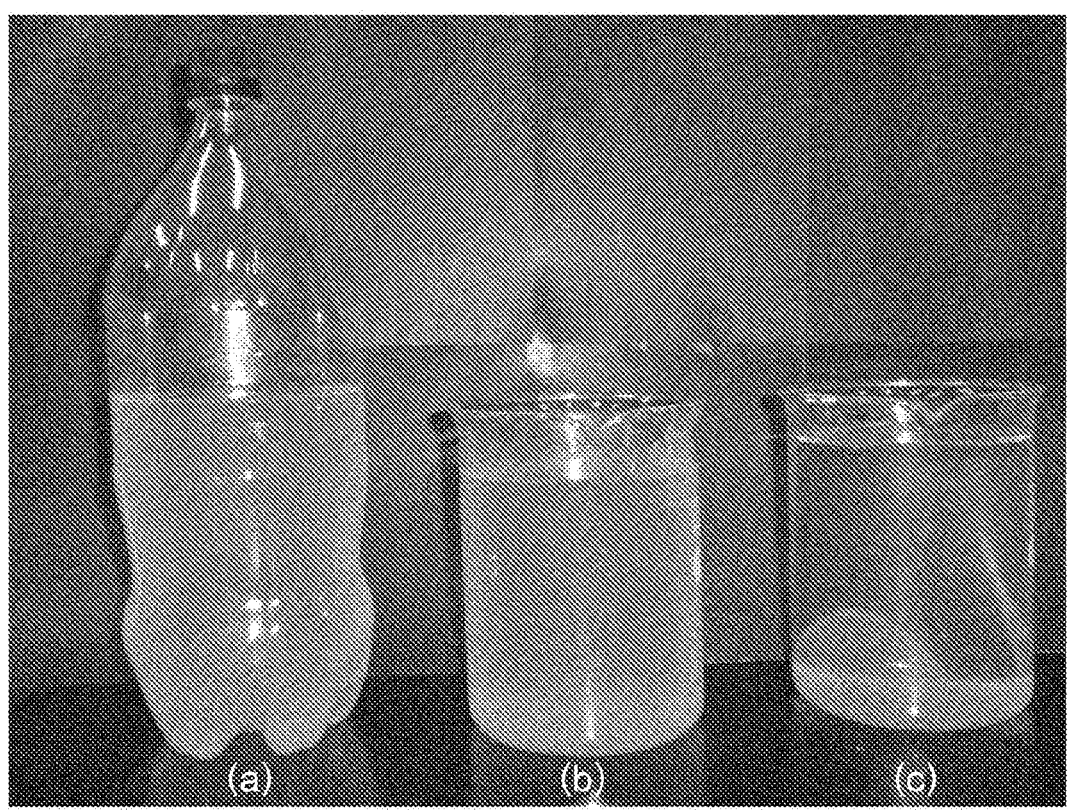
FIG. 9 is a photograph of comparison of an effect of ionization treatment in the present invention.
Figure 10:
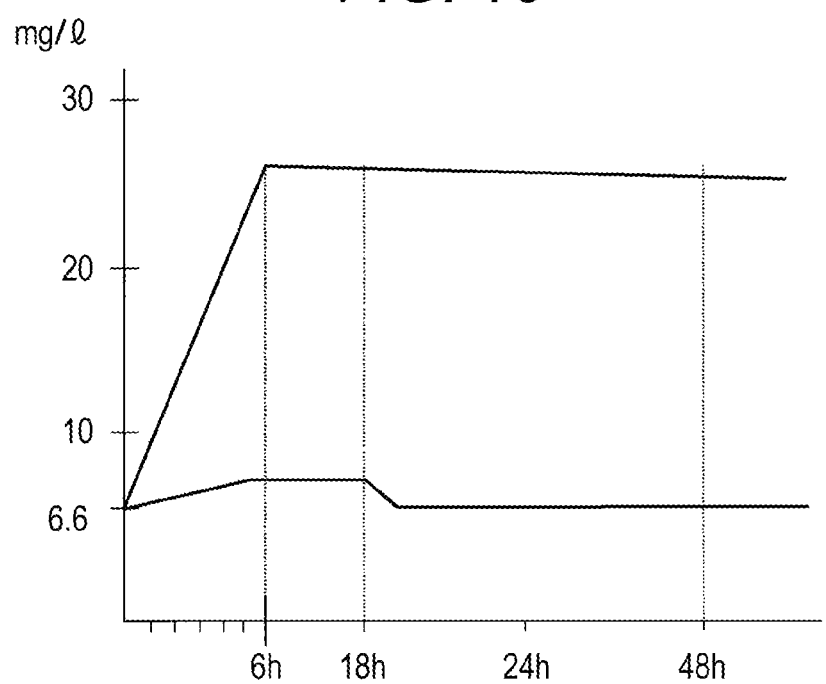
FIG. 10 shows dissolved oxygen amount graphs regarding an effect obtained by use of the device of the present invention.

In this case, when the pressurized air is sprayed by a gas spray port 31a having an opening at a wall portion of the water path as illustrated in FIG. 8(a), a two-phase flow with two phases of gas and liquid is easily generated. Thus, the fine air bubbles cannot be formed. For this reason, as illustrated in FIGS. 8(b), 8(c), and 8(d), the gas spray port is, as a preferable configuration, arranged in the vicinity of the substantially center of the water path with a high flow velocity. FIG. 8(b) illustrates such a configuration that a gas spray port 31b has an opening at the substantially center along a flow direction. FIG. 8(c) illustrates such a configuration that a gas spray port 31c has an opening in a direction perpendicular to the flow direction. FIG. 8(d) illustrates such a configuration that a porous material 31d is used for a spray port so that the gas is sprayed through many fine holes. As a result of experiment, the configuration of FIG. 8(c) showed the highest fine air bubble formation effect. Note that a result difference is not so great. With any of these configurations, a favorable effect can be obtained.

Note that the ionized air formed into the fine air bubbles is subsequently accelerated and sprayed, in the spray nozzle 16, by the narrowed-diameter portion 23 with the narrowed diameter. Thus, the air is powerfully discharged to a distant location during fine air bubble formation. Accordingly, the organic substances as contaminated substances are decomposed physically and chemically. Meanwhile, environment where activity of the aerobic microorganisms for decomposing the organic substances is activated is maintained, so that a preferable state can be constantly held across a broad area.

Figure 12:
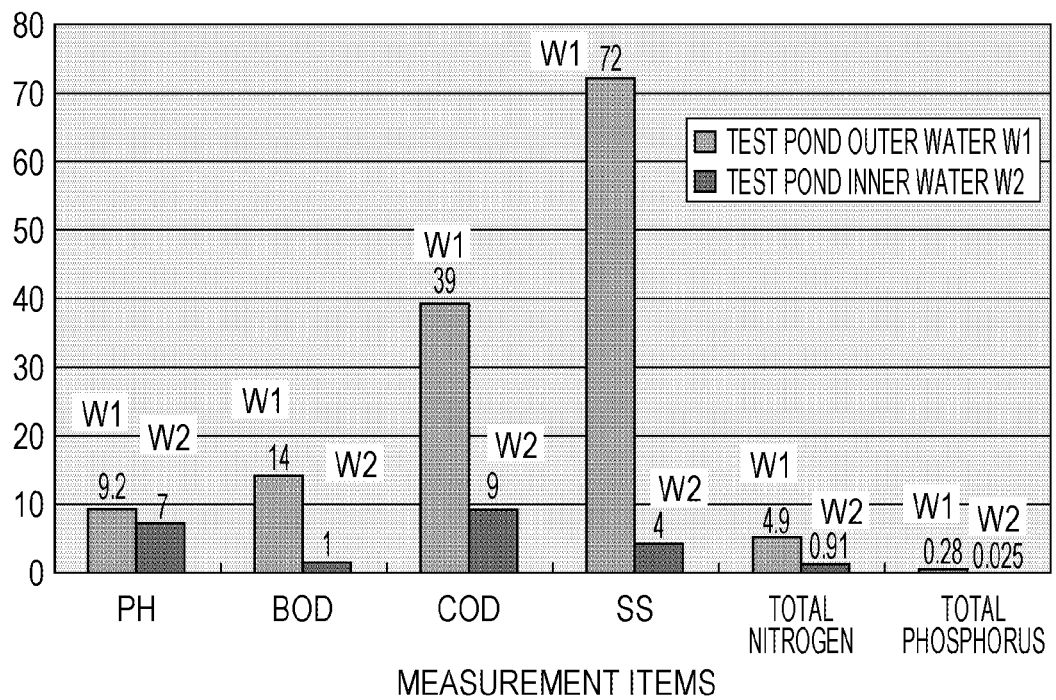
FIG. 12 shows graphs of the initial experiment results according to the present invention.
Figure 14:
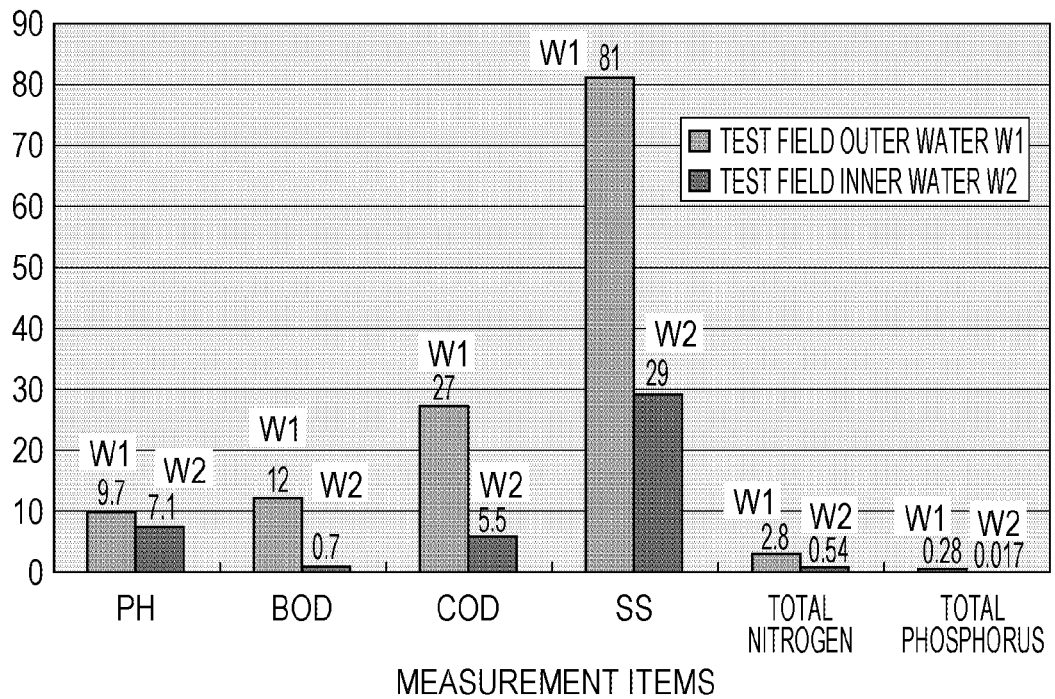
FIG. 14 shows graphs of the results after a lapse of about one month from the start of the experiment according to the present invention.
Figure 16:
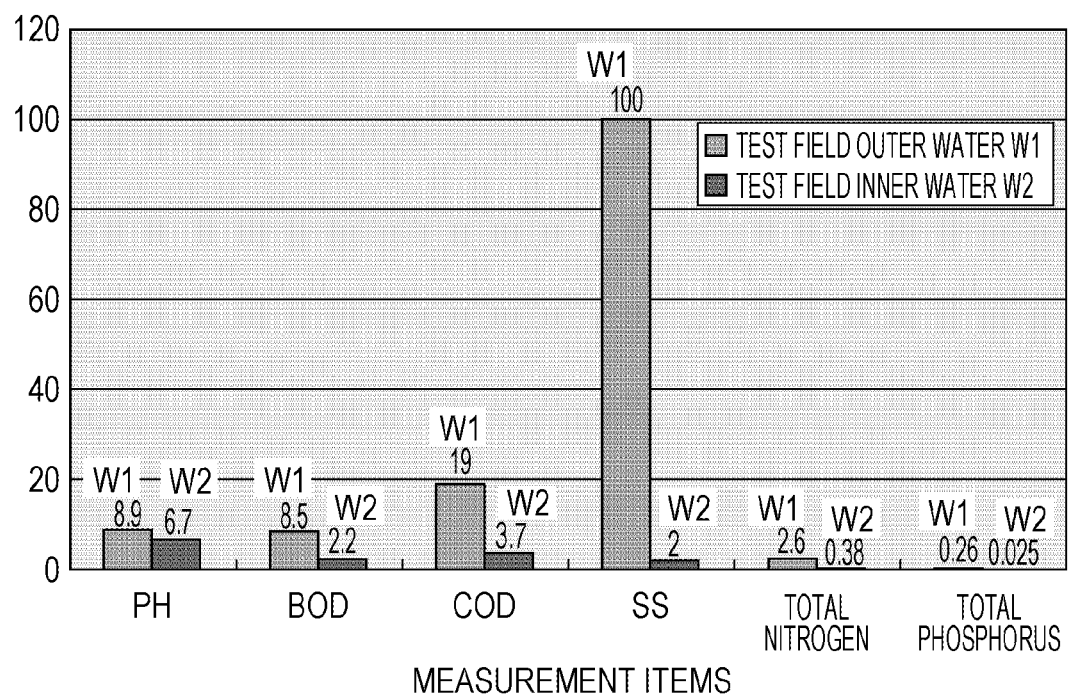
FIG. 16 shows graphs of the results just after a lapse of about three month from the start of the experiment according to the present invention.
Figure 18:
FIG. 18 is a view for describing a bay test result.
Figure 20:
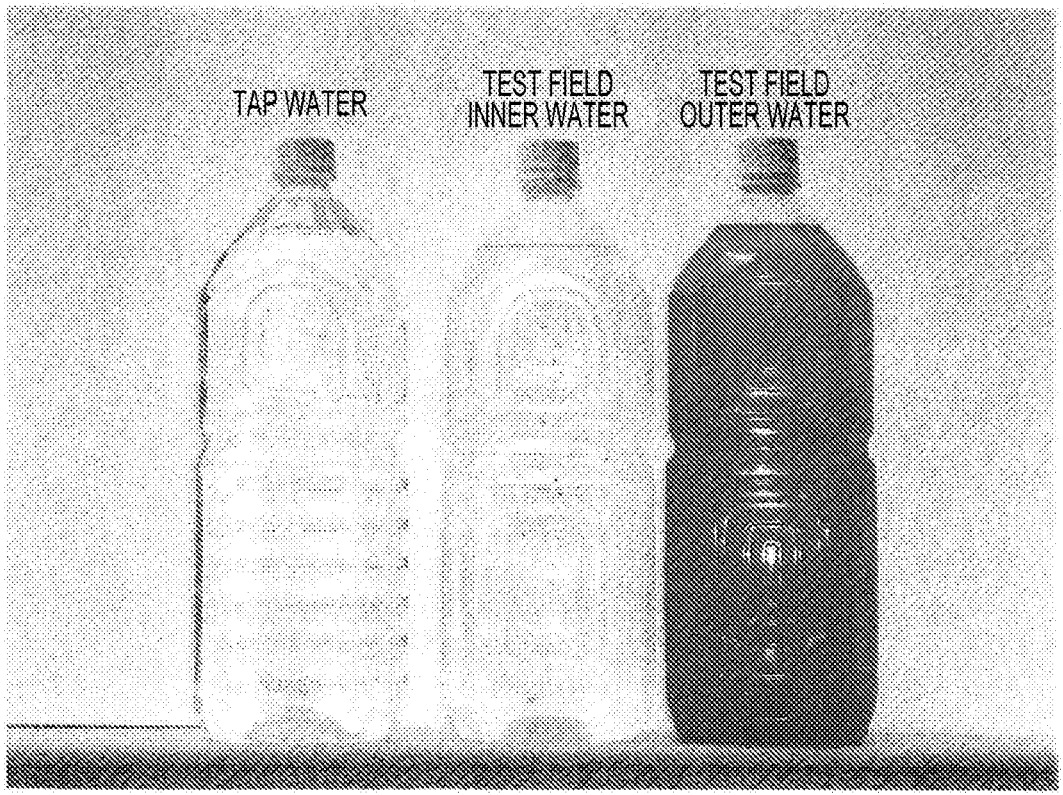
FIG. 20 is a photograph for comparison of the degree of transparency in the test for Shinobazu Pond according to the present invention.

FIGS. 11 to 16 show results of experiment conducted for Shinobazu Pond, the results showing the above-described effects. Shinobazu Pond is a natural pond located in Ueno Onshi Park at Taito Ward, Tokyo. FIGS. 11 and 12 show the results right after the start of the experiment. FIGS. 13 and 14 show the results after a lapse of about one month from the start of the experiment. FIGS. 15 and 16 show the results of measurement after a lapse of about three months from the start of the experiment. Note that measurement targets are six items including a hydrogen exponent (pH), a biochemical oxygen demand (BOD), a chemical oxygen demand (COD), a suspended solid (SS) (a suspended substance or a floating substance), total nitrogen (a generic term of compositions including nitrogen), and total phosphorus. Moreover, the water quality improvement method and the water quality improvement device 1 used for the experiment are the water quality improvement method according to claim 1 and the water quality improvement device 1 according to claim 5 as described in the claims of the present application.

First, the pH showed a great change in test pond outer water W1 and test pond inner water W2 right after the start of the test. The pH is a logarithm of an inverse of a hydrogen ion concentration in a water solution. A neutral pH with an equal concentration between the hydrogen ion concentration and a hydroxide ion concentration is seven. An alkaline pH is greater than seven, and an acid pH is the opposite. In river water without artificial contamination, the pH in rivers of our country is normally around the neutral pH while the pH mainly changes due to a geological factor in some cases. Exceptionally, there are marshes and the like with a high alkaline level due to influence of volcanoes or hot springs. However, there is no specialty in geological conditions in the vicinity of Shinobazu Pond used for the test. A pH of 6.5 to 8.5 in rivers and a pH of 7.8 to 8.3 in ocean areas are suitable for growth of living organisms. It is assumed that when the pH falls outside theses value ranges, a slowdown in production is caused due to losing of ecosystem balance. In an example of wet-field rice, a pH of about 6.0 to 7.5 (an agricultural water standard) is suitable. A pH of 6.5 to 8.5 is a preferable numerical value for tap water.

In any of periods right after the start of the test, after a lapse of about one month, and after a lapse of about three months, the test pond inner water W2 constantly showed a stable numerical value (a neutral pH) of 6.7 to 7.0 as compared to that of the test pond outer water W1 having a high alkaline level and having a great value of fluctuation.

Next, the BOD is a representative index of water contamination, and, indicates the amount of dissolved oxygen consumed by aerobic microorganisms in water. The BOD is normally represented by DO (mg/l) consumed at 20° C. for five days. It has been considered that a BOD of equal to or less than 5 mg/l is necessary for much carp and crucian carp living, in Shinobazu Pond. Moreover, in terms of environment conservation, a BOD of equal to or less than 10 mg/l is suitable in view of a relationship between an odor threshold and the DO. In any of the periods right after the start of the test, after a lapse of about one month, and after a lapse of about three months, the BOD was suppressed to equal to or less than 1 to 2.2, and effective results could be obtained.

As in the BOD, the COD is a representative index of water contamination. Environmental standards are set according to type such as lakes and ocean areas. The COD is represented by an oxygen amount corresponding to the obtained amount of permanganic acid consumed by thermolysis for 30 minutes during bathing. It is assumed that there is almost no artificial contamination at a COD of equal to or less than 1 mg/l. Thus, these lakes are suitable for a natural trip and the like. The standard of the amount of permanganic acid potassium salt consumption based on water quality standards according to the Water Supply Act is equal to or less than 10 mg/l. When such a standard is converted into the COD, the COD is equal to or less than 2.5 mg/l. In view of a water purification treatment capacity, the COD is equal to or less than 3 mg/l as tap water applicability of lakes. For agricultural water, when the COD is high, action of a root of a rice plant is lowered due to, solid reduction promotion, and root rot is caused. From the test results, the COD is preferably equal to or less than 6 mg/l. For bathing, there is no problem as long as the COD is equal to less than 3 mg/l. In addition, a COD of equal to or less than 8 mg/l is sufficient in terms of industrial water and environment conservation. According to the invention of the present application, in any of the periods right after the start of the test, after a lapse of about one month, and after a lapse of about three months, the COD could be suppressed within a target numerical value. In comparison between the test pond outer water W1 and the test pond inner water W2, a significant decrease was shown, and effective results could be obtained.

The SS indicates an infusible substance suspended in water. A grater numerical value of the SS results in more water contamination. According to the JIS standards, the SS is called a "suspended substance", and includes fine particles derived from clay mineral; zooplankton, phytoplankton, and carcasses thereof; organic substances derived, from drainage water and the like; and metal, for example. Generally, clear rivers mainly have a clay content, and an organic substance ratio increases as contamination progresses. In lakes and ocean areas, plankton and carcasses thereof increase according to seasons. A SS amount influences an outer appearance such as water turbidness, the degree of clearness, and the degree of transparency. Moreover, influence of the SS on an ecosystem includes suffocation of fish and photosynthesis inhibition of algae due to interference with penetration of sunbeams, for example. A normal SS in rivers is several tens of mg/l at the most. After raining, the SS may sometimes reach equal to or greater than several hundreds of mg/l. Moreover, for normal growth environment of aquatic lives, the SS is preferably equal to or less than 25 mg/l. The standard of the SS for agricultural water is equal to or less than 100 mg/l. According to the present test results, any of the items showed a significant decrease as illustrated in FIGS. 11 to 16 in comparison between the test pond outer water W1 and the test pond inner water W2.

Lastly, environment standards for the total nitrogen and the total phosphorus in lakes are set as preferable standards maintained for living environment conservation for prevention of growth of algae and the like in water. When a water area is eutrophied due to an increase in nitrogen and phosphorus concentrations in water, drawbacks upon utilization of the water area are caused. Such drawbacks include impairment of scenery due to lowering of the degree of transparency and the like, unusual smell and flavor of tap water, occurrence of filtration failure at a purification plant, and collapsed death of fish and shellfish, for example. In the case of first-class tap water, an environment standard value for the total nitrogen is equal to or less than 0.2 mg/l, and an environment standard value for the total phosphorus is equal to or less than 0.01 mg/l. In the case of agricultural water, the environment standard value for the total nitrogen is preferably equal to or less than 1 mg/l. In terms of environment conservation, the total nitrogen is preferably equal to or less than 1 mg/l and the total phosphorus is preferably equal to or less than 0.4 mg/l as a level not providing a feeling of discomfort to daily lives of citizens. From the test results by the water quality improvement method and the water quality improvement device 1 according to the invention of the present application, the total nitrogen was suppressed to equal to or less than 1, and the value of the total phosphorus was 0.025. Thus, extremely-effective effects could be obtained.

The above-described results of the water quality test for Shinobazu Pond was obtained by Environment Technology Association Tochigi (located at 2145-13 Shimookamoto, Utsunomiya City, Tochigi). Note that the above-described effects can be clearly and visually recognized. FIG. 17 shows the effects. FIG. 15(a) shows a state in which water cannot be taken in through a water suction port due to a layer of a fixed floc of blue-green algae and sludge. FIG. 15(b) shows that the floc of the blue-green algae and the sludge is taken into the above-described device and pond water appears around the above-described device to exhibit an excellent water purification effect. FIG. 15(c) shows that the blue-green algae and the sludge are in a state of floating on the water due to ionization action. FIGS. 15(d) and 17 show that the water quality is improved while the degree of transparency is improved as shown in photographs.

Next, results of a test by the water quality improvement method and the water quality improvement device 1 according to claim 2 as described in the claims of the present application will be described. The oxygen supply device 5 was used, and a crude oil decomposition test was performed for the oil spill in the Gulf of Mexico (Orange Beach, Ala. 36561) by means of the water quality improvement method and the water quality improvement device 1. In the oxygen supply device 5, the charged zeolite powder adsorbs the nitrogen component, so that the oxygen concentration increases. In the water quality improvement method and the water quality improvement device 1, the oxygen amount increasing step of increasing the oxygen concentration of air taken in at the air suction step is performed as a preceding process of the ionization step. The test results are based on a test at each point of the bay shown in FIGS. 16 and 17. The water quality improvement device 1 was placed at an edge of the bay where oil covered with a surfactant was drifting, and the test for sucking surrounding seawater and returning treatment water to the bay was implemented. As a result, only on the fourth day, the oil was decomposed, and the seawater was brought back to a transparent state. This provides such an effective that crabs and starfishes on a sea bottom at a water depth of 2 m are visible. Moreover, an increase in the oxygen concentration as illustrated in FIG. 17 (after a lapse of one week) was also exhibited.

INDUSTRIAL APPLICABILITY

A main object of the water quality improvement method and device for rivers, lakes, and bays according to the present invention is that these method and device are literally used as the method and device for improving the water quality by decomposition of contaminated substances including organic substances, the contaminated substances floating on rivers, lakes, and bays. Instead, the water quality improvement method and device according to the present invention are also available for cultivation of fish. Further, due to size reduction, the water quality improvement method and device according to the present invention are also available for an improvement tank for home use.

DESCRIPTION OF REFERENCE SIGNS

1 Water quality improvement device
2 Air pump
3 Air filter
4 Air line
5 Oxygen supply device
6 Ion generation device
7 Check valve
8 Coupling portion
9 Battery
10 Water suction pump
11 Water absorption filter
12 Growing light emission device
13 Water line
14 Eddy turbulence generation device
16 Spray nozzle
17 Distribution board
18 Growing light emission net
19 Growing light emission ceramic
20 Ionization ceramic
21 Ion generator
22 Container
23 Narrowed-diameter portion
31a Gas spray port
31b Gas spray port
31c Gas spray port
31d Porous material
100 Ionization step
200 Mixing step
300 Accelerated spraying step
400 Growing light emission step
500 Oxygen amount increasing step
600 Gas-liquid mixing fluid
V1 First fine air bubble formation
V2 Second fine air bubble formation
W1 Test pond outer water
W2 Test pond inner water

The invention claimed is:

1. A water quality improvement method comprising:
a water suction step of taking in pretreatment water through a water suction port;
an air supply step of compressing air taken in through an air suction port and supplying the air while an oxygen amount is being increased;
an ionization step of ionizing, by an ion generation device, the compressed air taken in at the air supply step;
a mixing step of obtaining gas-liquid mixing fluid by coupling, at a coupling portion, a flow path for the compressed air ionized through the ionization step and a flow path for the pretreatment water taken in at the water suction step and of performing first fine air bubble formation for the gas-liquid mixing fluid by means of an eddy turbulence generation device; and
an accelerated spraying step of narrowing a diameter of a discharge port to accelerate and spray the gas-liquid mixing fluid formed into a fine air bubble into water, thereby further performing second fine air bubble formation.

2. The water quality improvement method according to claim 1, wherein
an oxygen enriching step of increasing an oxygen concentration of the air taken in at the air supply step by means of an oxygen enriching device configured to increase the oxygen concentration by adsorbing a nitrogen component by charged zeolite powder is performed as a preceding process of the ionization step.

3. The water quality improvement method according to claim 1, wherein
at the ionization step, ionization is performed by a growing light emission net.

4. A water quality improvement device for performing the water quality improvement method according to claim 1, the water quality improvement device comprising:
a water suction pump configured to, at the water suction step, suck the pretreatment water through the water suction port and pressure-feed the pretreatment water to a water line;
an air pump configured to, at the air supply step, suck the air in atmosphere through the air suction port and supply the air to the ion generation device through an air line while compressing the air to increase the oxygen amount,
the ion generation device configured to ionize the air supplied by the air pump;
the coupling portion coupling the air line as the flow path of the compressed air ionized by the ion generation device and the water line as the flow path of the pretreatment water supplied by the water suction pump;
the eddy turbulence generation device; and
an accelerated spray device configured to perform accelerated spraying into the water, at the accelerated spray step, by narrowing of the diameter of the discharge port.

5. The water quality improvement device according to claim 4, wherein
an oxygen increasing device configured to increase an oxygen content percentage in gas by adsorbing and removing nitrogen m the air is arranged upstream of the ion generation device.

6. The water quality improvement device according to claim 4, wherein
the ion generation device includes an ionization ceramic chip surrounded by the growing light emission net.

7. The water quality improvement device according to claim 4, wherein
the ion generation device includes a housing pipe of a porous conjugate chip obtained in such a manner that ceramic mineral having performance for ionizing the air is dispersed over an arum root fiber.

* * * * *